United States Patent
Ali et al.

(10) Patent No.: US 10,883,021 B2
(45) Date of Patent: *Jan. 5, 2021

(54) ADHESIVE COMPOSITION AND MASKING ARTICLE FOR PRODUCING PRECISE PAINT LINES

(71) Applicant: 3M INNOVATIVE PROPERTIES COMPANY, St. Paul, MN (US)

(72) Inventors: Mahfuza B. Ali, Mendota Heights, MN (US); Elizabeth E. Johnson, Afton, MN (US); Michael D. Crandall, Sparks, NV (US)

(73) Assignee: 3M Innovative Properties Company, St. Paul, MN (US)

( * ) Notice: Subject to any disclaimer, the term of this patent is extended or adjusted under 35 U.S.C. 154(b) by 62 days.

This patent is subject to a terminal disclaimer.

(21) Appl. No.: 15/803,168

(22) Filed: Nov. 3, 2017

(65) Prior Publication Data

US 2018/0051190 A1    Feb. 22, 2018

Related U.S. Application Data

(63) Continuation of application No. 14/102,258, filed on Dec. 10, 2013, now Pat. No. 9,828,530.

(60) Provisional application No. 61/737,225, filed on Dec. 14, 2012.

(51) Int. Cl.
| | |
|---|---|
| *C09J 7/38* | (2018.01) |
| *C09J 133/14* | (2006.01) |
| *C08F 218/08* | (2006.01) |
| *C08F 220/34* | (2006.01) |
| *C08F 226/10* | (2006.01) |
| *C08F 220/18* | (2006.01) |
| *B05D 1/32* | (2006.01) |

(52) U.S. Cl.
CPC ............ *C09J 7/385* (2018.01); *B05D 1/325* (2013.01); *C08F 218/08* (2013.01); *C08F 220/34* (2013.01); *C08F 226/10* (2013.01); *C09J 133/14* (2013.01); *C08F 220/1804* (2020.02); *C09J 2203/31* (2013.01); *C09J 2433/00* (2013.01); *Y10T 428/1476* (2015.01); *Y10T 428/24777* (2015.01); *Y10T 428/2848* (2015.01); *Y10T 428/2891* (2015.01)

(58) Field of Classification Search
CPC .... C09J 7/385; C09J 2203/31; C09J 2433/00; C09J 133/14; B05D 1/325; C08F 220/1804; C08F 220/34; C08F 218/08; C08F 226/10

See application file for complete search history.

(56) References Cited

U.S. PATENT DOCUMENTS

| | | | |
|---|---|---|---|
| 3,922,464 A | 11/1975 | Silver | |
| 4,987,186 A | 1/1991 | Akiyama | |
| 5,096,761 A | 3/1992 | Roberts et al. | |
| 5,215,818 A | 6/1993 | Siver et al. | |
| 5,240,989 A * | 8/1993 | Bernard | C08F 220/12 524/556 |
| 5,264,533 A * | 11/1993 | Rehmer | C08F 220/36 522/116 |
| 5,612,136 A | 3/1997 | Everaert et al. | |
| 5,670,557 A | 9/1997 | Dietz et al. | |
| 5,714,237 A | 2/1998 | Cooprider et al. | |
| 5,846,621 A * | 12/1998 | Nagamatsu | H05K 13/003 428/40.1 |
| 6,103,316 A * | 8/2000 | Tran | C08F 290/044 427/505 |
| 6,479,073 B1 | 11/2002 | Lucast | |
| 6,710,128 B1 * | 3/2004 | Helmer | C08F 2/16 524/560 |
| 6,828,008 B2 | 12/2004 | Gruber | |
| 6,838,078 B2 | 1/2005 | Wang et al. | |
| 6,864,335 B2 | 3/2005 | Guo et al. | |
| 7,005,031 B2 | 2/2006 | Lucast et al. | |
| 7,071,261 B2 * | 7/2006 | Devonport | A01N 25/10 524/555 |
| 7,094,830 B2 * | 8/2006 | Xue | C08F 2/44 523/205 |
| 9,828,530 B2 * | 11/2017 | Ali | C09J 133/14 |
| 10,597,564 B2 * | 3/2020 | El Hedok | C08L 61/14 |
| 2005/0027283 A1 * | 2/2005 | Richard | A61K 9/0024 604/890.1 |
| 2010/0307411 A1 | 12/2010 | Scholz et al. | |
| 2011/0178250 A1 | 7/2011 | Steelman et al. | |
| 2019/0338164 A1 * | 11/2019 | El Hedok | C09J 133/04 |

FOREIGN PATENT DOCUMENTS

| | | |
|---|---|---|
| EP | 1 371 705 | 12/2003 |
| JP | H09-157597 | 6/1997 |
| WO | WO 02/00742 A1 | 1/2002 |

OTHER PUBLICATIONS

PCT International Search Report for PCT/US2013/074172 dated Mar. 26, 2014, 5 pages.
"Peel Adhesion of Pressure Sensitive Tape", Harmonized International Standard, 10 pages, May 2007.

* cited by examiner

*Primary Examiner* — Scott R. Walshon
(74) *Attorney, Agent, or Firm* — Kevin Weber

(57) ABSTRACT

An adhesive article for masking a portion of a substrate surface from a liquid coating applied to the surface includes a support having first and second opposed major surfaces, and a cationic or zwitterionic adhesive composition disposed on at least a portion of at least one of the first and second opposed major surfaces. The adhesive composition provides a barrier that impedes the migration of the coating past the edge of the adhesive article.

13 Claims, No Drawings

ADHESIVE COMPOSITION AND MASKING ARTICLE FOR PRODUCING PRECISE PAINT LINES

CROSS REFERENCE TO RELATED APPLICATIONS

This application is a continuation application of U.S. utility patent application Ser. No. 14/102,258, filed Dec. 10, 2013, which claims the benefit of U.S. Provisional Patent Application No. 61/737,225, filed Dec. 14, 2012, the disclosures of which are incorporated by reference herein.

BACKGROUND

The present disclosure relates generally to masking articles, such as masking tape, and, more particularly, to a masking article that produces precise paint lines, and to adhesive compositions for making masking articles.

When applying a surface coating, such as paint or stain, to a surface, care must be taken so that the paint does not get on the surfaces adjacent to the surface to be painted. This can be accomplished by carefully painting the surface, or by masking off the area around the surface to be painted. Masking articles, such as masking tapes and adhesive masking sheets, are often used to protect the area adjacent to the surface being painted. When using such masking articles, it is generally desirable that the paint not bleed past the demarcation line defined by the edge of the masking article. In this manner, the masking article will produce a paint line between the painted surface and unpainted surface that is smooth and consistent, and precisely matches the line intended by the user. Depending on a number of factors, such as how well such masking articles are applied to the surface, the energy of the surface, and the texture of the surface to which such masking articles are applied, paint may flow beyond the edge of the masking article and under certain regions of the masking article, thereby producing an imprecise paint line.

Adhesive tapes and masking materials having an edge coating for improving the masking ability of the materials are known in the prior art. U.S. Pat. No. 6,828,008 (Gruber), for example, discloses an absorbent edge coating for masking tape and other masking materials. The masking tape comprises a substrate having a top surface, a bottom surface, and at least one masking edge. The bottom surface of the substrate has an adhesive layer applied thereto. An absorbent edge coating is applied to at least one masking edge of the substrate so as to at least substantially prevent liquids addressed to the at least one coated masking edge from being absorbed into the substrate of the tape and from passing between the bottom surface of the tape and a surface to which the tape has been applied.

U.S. Patent Publication No. 2010/0307411 discloses an adhesive masking article for shielding a protected work surface from a coating applied to a surface adjacent the protected work surface, the masking article including a backing layer having first and second opposed major surfaces, and at least one edge. The masking article has an adhesive on at least a portion of at least one of the first and second backing layer opposed major surfaces and a water soluble cationic barrier inducing compound present on at least the edge of the masking article. The cationic compound contacts the coating when the coating comes into contact with the edge of the backing layer and destabilizes the coating, thereby producing a barrier effect.

Previous attempts to develop masking articles that impede the migration of paint past the edge of the masking article suffer from a number of drawbacks and disadvantages. For example, known adhesive masking articles may include the use of ingredients that are difficult to apply to the masking article during the manufacturing process, may require expensive packaging to maintain their effectiveness, may be harmful if ingested, and/or may cause skin, eye and nose irritation, which may require warnings and/or special handling instructions, or may produce unintended and undesirable effects at either the interface of the masking article and the paint, or on the surface to be painted.

Masking articles can include superabsorbent polymers (SAPs), such as sodium polyacrylate, as edge treatments. In addition, because of their absorbency, when masking articles including superabsorbent polymers are used in paint masking applications, an undesirable raised region, or ridge, of paint is often created along the edge of the masking article. This raised region generally takes longer to dry, and is therefore more susceptible to damage prior to fully drying. In addition, loose or excess SAP may fall onto the surface to be painted. SAP on the surface to be painted may, in turn, interfere with the application of paint to the surface (i.e., it may create an unsightly blotchy appearance in the paint).

Additionally, masking articles, such as adhesive tapes, having an edge coating suffer from certain inherent disadvantages. First, when a user divides the article, e.g., tears off a piece of tape, the new edge created by the division does not have the edge coating for preventing flow of paint beyond the edge of the masking article. Second, providing edge coatings necessitates a separate processing step in making the article or tape. Third, edge coatings almost inevitably cause differences in adhesion of the article to a given substrate at the edge vs. the remainder of the article. Increased adhesion can cause difficulty in removing the article from the substrate after paint is applied, can cause residual materials to be left on the substrate after removal, or both. Decreased adhesion can lead to egress of the paint during coating. A related issue is that edge coatings may suffer from lack of adhesion to the article itself, and may flake off, preferentially adhere to the substrate on which the article is applied, or otherwise depart from the article and thereby fail to provide the intended protection. Fourth, edge coatings represent a separate and, in some cases costly, additional step in processing. A related issue is that edge coatings are highly impractical to manufacture in any form but a straight-edged product, such as a tape. Manufacturing of masking articles such as stencils or other non-linear shapes is impracticable using edge-coating technology.

The need exists for adhesive masking articles that address the above listed limitations. Additionally, the need exists for an adhesive masking article for paint masking that is easy to make, does not require special packaging, is safe and easy to use, and produces sharp, clean, precise, smooth, even paints lines. The terms "sharp", "clean", "precise", "smooth" and "even", when used to describe a paint line, generally refer to a paint line that corresponds to and is defined by the edge of the masking article. That is, a sharp, clean, precise, smooth, or even paint line is one in which the paint does not extend significantly beyond the edge of the masking article so as to penetrate under the masking article. Thus, a "sharp", "clean", "smooth", or "even" paint line has minimal or no paint bleed under the article (i.e., little or no paint flow between the masking article and masked surface).

SUMMARY

In some embodiments, the present disclosure provides an adhesive composition including a polymer, the polymer consisting essentially of the polymerized product of about 0 wt % to 5 wt % based on the total weight of the polymer of a carboxylate salt of acrylic acid or methacrylic acid, or a mixture of two or more thereof, wherein the amount of carboxylate salt is determined based on the weight of the corresponding free acid; about 50 wt % to 95 wt % based on the total weight of the polymer of an acrylate or methacrylate ester of an alcohol having between 8 and 12 carbons; about 2 wt % to 45 wt % based on the total weight of the polymer of an acrylate or methacrylate ester including an alkylammonium functionality; and about 0 wt % to 30 wt % based on the total weight of the polymer of an additional monomer.

In some embodiments, the present disclosure provides an adhesive article including a support having first and second opposed major surfaces and an adhesive composition disposed on at least a portion of at least one of the first and second opposed major surfaces, wherein the adhesive composition includes a polymer, the polymer consisting essentially of the polymerized product of about 0 wt % to 5 wt % based on the total weight of the polymer of a carboxylate salt of acrylic acid or methacrylic acid, or a mixture of two or more thereof, wherein the amount of carboxylate salt is determined based on the weight of the corresponding free acid; about 50 wt % to 95 wt % based on the total weight of the polymer of an acrylate or methacrylate ester of an alcohol having between 8 and 12 carbons; about 2 wt % to 45 wt % based on the total weight of the polymer of an acrylate or methacrylate ester including an alkylammonium functionality; and about 0 wt % to 30 wt % based on the total weight of the polymer of an additional monomer. In some embodiments, the article is a masking tape. In some embodiments, the article is a stenciling article.

In some embodiments, the present disclosure provides method of making a masking article wherein the article is capable of substantially preventing one or more liquids or liquid-borne materials from contacting a masked surface, the method including
forming a reaction mixture including about 15 wt % to 60 wt % monomers in water, wherein the monomers consist essentially of about 0 parts by weight to 5 parts by weight of acrylic acid, methacrylic acid, or a combination of two or more thereof; about 50 parts by weight to 95 parts by weight based on the total weight of the polymer of an acrylate or methacrylate ester of an alcohol having between 8 and 12 carbons; about 2 parts by weight to 45 parts by weight based on the total weight of the polymer of an acrylate or methacrylate ester including an alkylammonium functionality; and about 0 parts by weight to 30 parts by weight based on the total weight of the polymer of an additional monomer; polymerizing the monomers to form a polymerized mixture, adjusting the pH of the polymerized mixture from 2-3 to 4-7 to form a neutralized mixture, coating the neutralized mixture onto a support, and drying the coated neutralized mixture.

In embodiments, the adhesive articles of the invention are characterized by their performance as pressure sensitive adhesives that prevent one or more liquids or liquid-borne materials from penetrating the interface of the adhesive composition and the substrate onto which an adhesive article is applied.

Additional advantages and novel features of the invention will be set forth in part in the description that follows, and in part will become apparent to those skilled in the art upon examination of the following, or may be learned through routine experimentation upon practice of the invention.

DETAILED DESCRIPTION

Various embodiments will now be described in detail. Reference to various embodiments does not limit the scope of the claims attached hereto. Additionally, any examples set forth in this specification are not intended to be limiting and merely set forth some of the many possible embodiments for the appended claims.

Definitions

As used herein, the term "cationic polymer" or similar terms means a polymer having at least one cationic moiety covalently bonded within a polymer chain, substantially in the absence of anionic moieties also covalently bonded within the polymer chain. The cationic moieties are suitably disposed within the polymer backbone, are pendant to the polymer backbone, or a mixture thereof. In some embodiments, there is a single cationically functional monomer covalently bonded within the cationic polymer; in other embodiments there is more than one cationic moiety covalently bonded within the cationic polymer. In some embodiments, there are one or more nonionic moieties covalently bonded within the cationic polymer. In some embodiments the cationic moieties are randomly distributed within a polymer chain; in other embodiments the cationic moieties are present in an alternating pattern, a blocky pattern, or another regular or semi-regular pattern within the polymer chain.

As used herein, the term "zwitterionic polymer" or similar terms means a polymer having at least one anionic moiety and at least one cationic moiety covalently bonded within a single polymer chain. The anionic and cationic moieties are suitably disposed within the polymer backbone, are pendant to the polymer backbone, or a mixture thereof. In some embodiments the anionic and cationic moieties are present on the same backbone or pendant unit; in other embodiments the anionic and cationic moieties are present on different backbone or pendant units. In some embodiments the anionic and cationic moieties are randomly distributed within a polymer chain; in other embodiments the anionic and cationic moieties are present in an alternating pattern, a blocky pattern, or another regular or semi-regular pattern within the polymer chain. In some embodiments the anionic and cationic moieties are present in a 1:1 molar ratio within the polymer chain. In other embodiments, the anionic moieties are present in a molar excess relative to the cationic moieties within the polymer chain. In still other embodiments, the cationic moieties are present in a molar excess relative to the anionic moieties within the polymer chain. In some embodiments, there is a single anionically functional monomer covalently bonded within the zwitterionic polymer; in other embodiments there is more than one anionically functional monomer covalently bonded within the zwitterionic polymer. In some embodiments, there is a single cationically functional monomer covalently bonded within the zwitterionic polymer; in other embodiments there is more than one cationically functional monomer covalently bonded within the zwitterionic polymer. In some embodiments, there are one or more nonionic moieties covalently bonded within the zwitterionic polymer.

As used herein, the terms "polymerizable" or "curable" are applied to the compounds, also called "monomers", that are polymerizable and/or crosslinkable as a result of initiation by thermal decomposition, redox reaction, or photolysis. Such compounds have at least one α, β-unsaturated site. In some embodiments, monomers having more than one α, β unsaturated site are termed "crosslinkers" but it will be understood that the term "monomer" includes, as appropriate in context, compounds having more than one such site.

As used herein, the term "adhesive composition" or like terms means a cationic polymer, or a zwitterionic polymer, and optionally one or more additional components blended therewith, wherein the adhesive composition is a pressure sensitive adhesive composition when suitably employed as part of an adhesive article.

As used herein, the term "adhesive article" means a support having an adhesive composition coated thereon. An adhesive article is a masking article, though it is not a requirement that the adhesive article be used in a masking application. Adhesive articles include adhesive tapes, which can be used as a masking tape. Supports are any useful material capable of having the adhesive compositions coated thereon for use in a pressure sensitive adhesive application.

As used herein, the term "masking" means substantially preventing one or more liquids or liquid-borne materials from penetrating the interface of the adhesive composition and a substrate onto which an adhesive article is applied. As used herein in context with a masking application, the substrate onto which the adhesive article is applied is a "masked substrate." As used herein in context with a masking application, the portion of the substrate surface covered by the adhesive article and in contact with the adhesive composition is the "masked surface." Masking is achieved when one or more liquids or liquid-borne materials applied to the masked substrate are substantially prevented from contacting the masked surface.

As used herein, the term "substantial" or "substantially" means with relatively minor fluctuations or aberrations from the stated property, value, range of values, content, formula, and the like, and does not exclude the presence of additional materials, broader range values, and the like which do not materially affect the desired characteristics of a given composition, article, product, or method.

Cationic or Zwitterionic Polymers

The cationic polymers of the invention are copolymers including the polymerized product of polymerizable monomers including at least an acrylate or methacrylate ester of an alcohol having between 8 and 12 carbons and a cationic monomer that is an acrylate or methacrylate ester having an alkylammonium functionality. Optionally, one or more additional monomers are included in the cationic polymers of the invention. In some embodiments, the acrylate or methacrylate ester is a mixture of two or more such esters; in some embodiments, the cationic monomer is a mixture of two or more such cationic monomers.

In embodiments, the acrylate or methacrylate ester of an alcohol having between 8 and 12 carbons includes acrylate or methacrylate esters of linear, branched, or cyclic alcohols. While not intended to be limiting, examples of alcohols useful in the acrylate or methacrylate esters include octyl, isooctyl, nonyl, isononyl, decyl, undecyl, and dodecyl alcohol. In embodiments, the alcohol is isooctyl alcohol. In some embodiments, the acrylate or methacrylate ester of an alcohol having between 8 and 12 carbons is a mixture of two or more such compounds. In embodiments, polymerized product of the acrylate or methacrylate ester of an alcohol having between 8 and 12 carbons is present in the cationic polymer at about 50 wt % to 95 wt % of the total weight of the polymer, or at about 60 wt % to 90 wt % of the total weight of the polymer, or at about 75 wt % to 85 wt % of the total weight of the polymer, or in various intermediate levels such as 51 wt %, 52 wt %, 53 wt %, 54 wt %, and all other such values individually represented by 1 wt % increments between 50 wt % and 95 wt %, and in any range spanning between any of these individual values in 1 wt % increments, for example ranges such as about 54 wt % to 81 wt %, about 66 wt % to 82 wt %, about 77 wt % to 79 wt %, and the like.

In embodiments, the cationic monomer is an acrylate or methacrylate ester including an alkylammonium functionality. In some embodiments, the cationic monomer is a 2-(trialkyl ammonium)ethyl acrylate or a 2-(trialkylammonium)ethyl methacrylate. In such embodiments, the nature of the alkyl groups is not particularly limited; however, cost and practicality limit the number of useful embodiments. In embodiments, the 2-(trialkyl ammonium)ethyl acrylate or 2-(trialkylammonium)ethyl methacrylate is formed from the reaction of 2-(dimethylamino)ethyl acrylate or 2-(dimethylamino)ethyl methacrylate with an alkyl halide; in such embodiments, at least two of the three alkyl groups of the 2-(trialkyl ammonium)ethyl acrylate or 2-(trialkylammonium)ethyl methacrylate are methyl. In some such embodiments, all three alkyl groups are methyl groups. In other embodiments, two of the three alkyl groups are methyl and the third is a linear, branched, cyclic, or alicyclic group having between 2 and 24 carbon atoms, or between 6 and 20 carbon atoms, or between 8 and 18 carbon atoms, or 16 carbon atoms. In some embodiments, the cationic monomer is a mixture of two or more of these compounds.

The anion associated with the ammonium functionality of the cationic monomer is not particularly limited, and many anions are useful in connection with various embodiments of the invention. In some embodiments, the anion is a halide anion, such as chloride, bromide, fluoride, or iodide; in some such embodiments, the anion is chloride. In other embodiments the anion is $BF_4$, $N(SO_2CF_3)_2$, $O_3SCF_3$, or $O_3SC_4F_9$. In other embodiments, the anion is methyl sulfate. In still other embodiments, the anion is hydroxide. In some embodiments, the one or more cationic monomers includes a mixture of two or more of these anions. In some embodiments, polymerization is carried out using 2-(dimethylamino)ethyl acrylate or 2-(dimethylamino)ethyl methacrylate, and the corresponding ammonium functionality is formed in situ by reacting the amino groups present within the polymer with a suitable alkyl halide to form the corresponding ammonium halide functionality. In other embodiments, the ammonium functional monomer is incorporated into the cationic polymer and then the anion is exchanged to provide a different anion. In such embodiments, ion exchange is carried out using any of the conventional processes known to and commonly employed by those having skill in the art.

In embodiments, the polymerized product of the cationic monomer is present in the cationic polymer at about 2 wt % to 45 wt % based on the total weight of the cationic polymer, or at about 2 wt % to 35 wt % of the cationic polymer, or at about 4 wt % to 25 wt % of the cationic polymer, or at about 6 wt % to 15 wt % of the cationic polymer, or at about 7 wt % to 10 wt % of the cationic polymer, or in various intermediate levels such as 3 wt %, 5 wt %, 6 wt %, 8 wt %, and all other such individual values represented by 1 wt % increments between 2 and 45 wt %, and in any range spanning these individual values in 1 wt % increments, such as 2 wt % to 4 wt %, 7 wt % to 38 wt %, 20 wt % to 25 wt %, and the like.

In embodiments, the polymerized product of one or more additional monomers is included in the cationic polymers of the invention. Such additional monomers are not particularly limited by structure, but exclude monomers having anionic functionality. Non-limiting examples of additional monomers are N-vinyl pyrrolidone, isobutyl (meth)acrylate, n-butyl (meth)acrylate, isopropyl (meth)acrylate, n-propyl (meth)acrylate, methyl (meth)acrylate, ethyl (meth)acrylate, vinyl acetate, hydroxyethyl (meth)acrylate, hydroxypropyl (meth)acrylate, octadecyl (meth)acrylate, stearyl (meth)acrylate, dimethyl acrylamide, N-(hydroxymethyl)-acrylamide, dimethylaminoethyl (meth)acrylate, methoxy polyethylene glycol (meth)acrylate, polydimethylsiloxane (meth)acrylate), KF 2001 (mercapto modified dimethylsiloxane), perfluorobutyl sulfonamido n-methyl ethyl acrylate, and hexafluoropropylene oxide oligomer amidol (meth)acrylate. In some embodiments, the additional monomer is a mixture of two or more of these monomers. In some embodiments, the additional monomer is vinyl acetate. In some embodiments, the additional monomer is isobutyl acrylate. In some embodiments, the additional monomer is N-vinyl pyrrolidone. In some embodiments, the additional monomer is a mixture of vinyl acetate and N-vinyl pyrrolidone.

In some embodiments, the additional monomer is selected to impart to the resulting cationic polymer a reduced level of measurable adhesion to a selected substrate, while still providing the level of tack of the cationic polymer relative to the polymer without the one or more additional monomers. In other embodiments, the additional monomer is selected to impart to the resulting cationic polymer a reduced level of tack, while maintaining a substantially constant level of adhesion of the cationic polymer to a selected substrate relative to the polymer without the one or more additional monomers. In still other embodiments, the additional monomer is selected to impart to the resulting cationic polymer an increased level of tack, while maintaining a substantially constant level of adhesion of the cationic polymer to a selected substrate relative to the polymer without the one or more additional monomers.

The polymerized product of the one or more additional monomers is present in the cationic polymer at about 0 wt % to 30 wt % based on the total weight of the cationic polymer, or about 2 wt % to 20 wt % based on the total weight of the cationic polymer, or at about 3 wt % to 15 wt % of the cationic polymer, or at about 5 wt % to 10 wt % of the cationic polymer, or in various intermediate levels such as 1 wt %, 3 wt %, 4 wt %, 5 wt %, 6 wt %, 7 wt %, and all other such individual values represented by 1 wt % increments between 0 wt % and 30 wt %, and in any range spanning these individual values in 1 wt % increments, such as about 2 wt % to 4 wt %, about 11 wt % to 28 wt %, about 7 wt % to 17 wt %, and the like. All such ranges suitably include 0%.

In some embodiments, the additional monomer has two or more polymerizable functionalities; such monomers are referred to as crosslinkers. Crosslinkers that are useful in forming the cationic polymers include, without limitation, diacrylates such as ethylene glycol diacrylate, hexanediol diacrylate, and tripropyleneglycol diacrylate; triacrylates such as glycerol triacrylate and trimethylolpropane triacrylate; and tetraacrylates such as erythritol tetraacrylate and pentaerythritol tetraacrylate; divinyl benzene and derivatives thereof, and the like. In some embodiments, the crosslinker is a photoactive crosslinker. Photoactive crosslinkers include, for example, benzaldehyde, acetaldehyde, anthraquinone, substituted anthraquinones, various benzophenone-type compounds and certain chromophore-substituted vinylhalomethyl-s-triazines, such as 2,4-bis(trichloromethyl)-6-p-methoxystyryl-s-triazine. In some embodiments the polymerized product of the crosslinker, as an additional monomer, is present in amounts as high as 30 wt % based on the total weight of the polymer, in other embodiments the polymerized product of the crosslinker is present in the cationic polymer at about 0 wt % to 10 wt % based on the total weight of the polymer, for example at about 0.01 wt % to 5 wt % or about 0.1 wt % to 2 wt %.

The zwitterionic polymers of the invention are copolymers that include the polymerized product of an anionic monomer that is acrylic acid, methacrylic acid, a salt thereof, or a blend thereof; an acrylate or methacrylate ester of an alcohol having between 8 and 12 carbons; and a cationic monomer that is an acrylate or methacrylate ester having alkylammonium functionality. Optionally, one or more additional monomers are included in the zwitterionic polymers of the invention. In some embodiments the anionic monomer is acrylic or methacrylic acid, the acid is converted either before or after polymerization to a corresponding carboxylate salt by neutralization. In some embodiments, the acrylic acid, methacrylic acid, or a salt thereof is a mixture of two or more thereof. In some embodiments, the acrylate or methacrylate ester is a mixture of two or more such esters; in some embodiments, the cationic monomer is a mixture of two or more such cationic monomers.

In embodiments, the polymerized product of acrylic acid, methacrylic acid, a salt thereof or blend thereof is present in the zwitterionic polymer at about 0.2 wt % to 5 wt % based on the total weight of the polymer, or at about 0.5 wt % to 5 wt % of the zwitterionic polymer, or in various intermediate levels such as 0.3 wt %, 0.4 wt %, 0.6 wt %, 0.7 wt %, and all other such individual values represented by 0.1 wt % increments between 0.2 and 5.0 wt %, and in ranges spanning between any of these individual values in 0.1 wt % increments, such as 0.2 wt % to 0.9 wt %, 1.2 wt % to 3.1 wt %, and the like.

In embodiments, the acrylate or methacrylate ester of an alcohol having between 8 and 12 carbons includes acrylate or methacrylate esters of linear, branched, or cyclic alcohols. While not intended to be limiting, examples of alcohols useful in the acrylate or methacrylate esters include octyl, isooctyl, nonyl, isononyl, decyl, undecyl, and dodecyl alcohol. In embodiments, the alcohol is isooctyl alcohol. In some embodiments, the acrylate or methacrylate ester of an alcohol having between 8 and 12 carbons is a mixture of two or more such compounds. In embodiments, polymerized product of the acrylate or methacrylate ester of an alcohol having between 8 and 12 carbons is present in the zwitterionic polymer at about 50 wt % to 95 wt % of the total weight of the polymer, or at about 60 wt % to 90 wt % of the total weight of the polymer, or at about 75 wt % to 85 wt % of the total weight of the polymer, or in various intermediate levels such as 51 wt %, 52 wt %, 53 wt %, 54 wt %, and all other such values individually represented by 1 wt % increments between 50 wt % and 95 wt %, and in any range spanning between any of these individual values in 1 wt % increments, for example ranges such as about 54 wt % to 81 wt %, about 66 wt % to 82 wt %, about 77 wt % to 79 wt %, and the like.

In embodiments, the cationic monomer is an acrylate or methacrylate ester including an alkylammonium functionality. In some embodiments, the cationic monomer is a 2-(trialkyl ammonium)ethyl acrylate or a 2-(trialkylammonium)ethyl methacrylate. In such embodiments, the nature of the alkyl groups is not particularly limited; however, cost and practicality limit the number of useful embodiments. In embodiments, the 2-(trialkyl ammonium)ethyl acrylate or 2-(trialkylammonium)ethyl methacrylate is formed by the reaction of 2-(dimethylamino)ethyl acrylate or 2-(dimethylamino)ethyl methacrylate with an alkyl halide; in such embodiments, at least two of the three alkyl groups of the 2-(trialkyl ammonium)ethyl acrylate or 2-(trialkylammonium)ethyl methacrylate are methyl. In some such embodiments, all three alkyl groups are methyl groups. In other embodiments, two of the three alkyl groups are methyl and the third is a linear, branched, cyclic, or alicyclic group having between 2 and 24 carbon atoms, or between 6 and 20 carbon atoms, or between 8 and 18 carbon atoms, or 16 carbon atoms. In some embodiments, the cationic monomer is a mixture of two or more of these compounds.

The anion associated with the ammonium functionality of the cationic monomer is not particularly limited, and many anions are useful in connection with various embodiments of the invention.

In some embodiments, the anion is a halide anion, such as chloride, bromide, fluoride, or iodide; in some such embodiments, the anion is chloride. In other embodiments the anion is $BF_4$, $N(SO_2CF_3)_2$, $O_3SCF_3$, or $O_{03}SC_4F_9$. In other embodiments, the anion is methyl sulfate. In still other embodiments, the anion is hydroxide. In some embodiments, the one or more cationic monomers includes a mixture of two or more of these anions. In some embodiments, polymerization is carried out using 2-(dimethylamino)ethyl acrylate or 2-(dimethylamino)ethyl methacrylate, and the corresponding ammonium functionality is formed in situ by reacting the amino groups present within the polymer with a suitable alkyl halide to form the corresponding ammonium halide functionality. In other embodiments, the ammonium functional monomer is incorporated into the cationic polymer and then the anion is exchanged to provide a different anion. In such embodiments, ion exchange is carried out using any of the conventional processes known to and commonly employed by those having skill in the art.

In embodiments, the polymerized product of the cationic monomer is present in the zwitterionic polymer at about 2 wt % to 45 wt % based on the total weight of the zwitterionic polymer, or at about 2 wt % to 35 wt % of the zwitterionic polymer, or at about 4 wt % to 25 wt % of the zwitterionic polymer, or at about 6 wt % to 15 wt % of the zwitterionic polymer, or at about 7 wt % to 10 wt % of the zwitterionic polymer, or in various intermediate levels such as 3 wt %, 5 wt %, 6 wt %, 8 wt %, and all other such individual values represented by 1 wt % increments between 2 and 45 wt %, and in any range spanning these individual values in 1 wt % increments, such as 2 wt % to 4 wt %, 7 wt % to 38 wt %, 20 wt % to 25 wt %, and the like.

In embodiments, the polymerized product of one or more additional monomers is included in the cationic polymers of the invention. Such additional monomers are not particularly limited by structure and include, in some embodiments, anionic functional monomers. Non-limiting examples of additional monomers are isobutyl acrylate, isobutyl methacrylate, n-butyl acrylate, n-butyl methacrylate, isopropyl acrylate, isopropyl methacrylate, n-propyl acrylate, n-propyl methacrylate, methyl acrylate, methyl methacrylate, ethyl acrylate, ethyl methacrylate, vinyl acetate, N-vinyl pyrrolidone, hydroxyethyl acrylate, or hydroxyethyl methacrylate. In some embodiments, the additional monomer is a mixture of two or more of these monomers. In some such embodiments, the additional monomer is vinyl acetate. In some such embodiments, the additional monomer is N-vinyl pyrrolidone. In some embodiments the additional monomer is isobutyl acrylate. In some embodiments, the additional monomer is a mixture of vinyl acetate and N-vinyl pyrrolidone. In some embodiments, the additional monomer is a mixture of vinyl acetate and isobutyl acrylate. In some embodiments, the additional monomer is a mixture of isobutyl acrylate and N-vinyl pyrrolidone.

The polymerized product of the one or more additional monomers is present in the zwitterionic polymer at about 0 wt % to 30 wt % based on the total weight of the zwitterionic polymer, or about 2 wt % to 20 wt % based on the total weight of the zwitterionic polymer, or at about 3 wt % to 15 wt % of the zwitterionic polymer, or at about 5 wt % to 10 wt % of the zwitterionic polymer, or in various intermediate levels such as 1 wt %, 3 wt %, 4 wt %, 5 wt %, 6 wt %, 7 wt %, and all other such individual values represented by 1 wt % increments between 0 wt % and 30 wt %, and in any range spanning these individual values in 1 wt % increments, such as about 2 wt % to 4 wt %, about 11 wt % to 28 wt %, about 7 wt % to 17 wt %, and the like. All such ranges suitably include 0%.

In some embodiments, the additional monomer is selected to impart to the resulting zwitterionic polymer a reduced level of measurable adhesion to a selected substrate, while still providing the level of tack of the zwitterionic polymer relative to the polymer without the one or more additional monomers. In other embodiments, the additional monomer is selected to impart to the resulting zwitterionic polymer a reduced level of tack, while maintaining a substantially constant level of adhesion of the zwitterionic polymer to a selected substrate relative to the polymer without the one or more additional monomers. In still other embodiments, the additional monomer is selected to impart to the resulting zwitterionic polymer an increased level of tack, while maintaining a substantially constant level of adhesion of the zwitterionic polymer to a selected substrate relative to the polymer without the one or more additional monomers.

In some embodiments, the additional monomer has two or more polymerizable functionalities; such monomers are referred to as crosslinkers. Crosslinkers that are useful in forming the zwitterionic polymers include, without limitation, diacrylates such as ethylene glycol diacrylate, hexanediol diacrylate, and tripropyleneglycol diacrylate; triacrylates such as glycerol triacrylate and trimethylolpropane triacrylate; and tetraacrylates such as erythritol tetraacrylate and pentaerythritol tetraacrylate; divinyl benzene and derivatives thereof, and the like. In some embodiments, the crosslinker is a photoactive crosslinker. Photoactive crosslinkers include, for example, benzaldehyde, acetaldehyde, anthraquinone, substituted anthraquinones, various benzophenone-type compounds and certain chromophore-substituted vinylhalomethyl-s-triazines, such as 2,4-bis(trichloromethyl)-6-p-methoxystyryl-s-triazine. In some embodiments the polymerized product of the crosslinker, as an additional monomer, is present in amounts as high as 30 wt % based on the total weight of the zwitterionic polymer, in other embodiments the polymerized product of the crosslinker is present in the zwitterionic polymer at about 0 wt % to 10 wt % based on the total weight of the polymer, for example at about 0.01 wt % to 5 wt % or about 0.1 wt % to 2 wt %.

Polymerization Processes

The polymerization of the cationic and zwitterionic polymers are carried out using conventional thermal or radiation polymerization techniques familiar to those of skill. For example, in some embodiments, the monomers and optional crosslinker are admixed, coated onto a tape backing or other support, and irradiated by UV or ebeam radiation. In some embodiments, air is partially excluded or limited in the reaction area during the irradiation. In some embodiments, an emulsion of monomer is formed and polymerization is carried out using UV or thermal initiation of the polymerization reaction. The emulsion is a water-in-oil or oil-in-water emulsion. In some embodiments, a solution of the monomers is formed in a solvent that is water, an aqueous mixture, or in a solvent other than water, and polymerization is carried out using UV or thermal initiation similarly to the emulsion reaction.

In some embodiments where UV radiation is employed, a photoinitiator is employed to initiate the polymerization reaction via photolysis. In some such embodiments, a photoinitiator is selected based on the wavelength of UV radiation to be employed. Where a photoinitiator is employed, it is included in the polymerization mixture at about 0.01 wt % to 5 wt % based on the total weight of the monomers, for example about 0.1 wt % to 2 wt % based on the total weight of the monomers, or about 0.2 wt % to 1 wt % based on the total weight of the monomers. Non-limiting examples of suitable photoinitiators include any of the metal iodides, alkyl metal compounds, or azo compounds familiar to those having skill in the art of UV initiated polymerization; and those sold under the trade name IRGACURE® by Ciba Specialty Chemicals Corp. of Tarrytown, N.Y.; those sold under the trade name CHEMCURE® by Sun Chemical Company of Tokyo, Japan; and those sold under the trade name LUCIRIN® by BASF Corporation of Charlotte, N.C. In the case of emulsion polymerization, water soluble initiators are preferred.

In some embodiments where thermal decomposition is employed to initiate polymerization, emulsion polymerization of the monomers employed to make the cationic or zwitterionic polymers of the invention is carried out by blending the monomers, surfactant(s), and a thermal initiator in water, followed by heating the emulsion to a temperature wherein decomposition of the initiator occurs at a rate suitable to sustain a suitable rate of polymerization. Non-limiting examples of suitable thermal initiators include any of the organic peroxides or azo compounds conventionally employed by those skilled in the art of thermal initiation of polymerization, such a dicumyl peroxide, benzoyl peroxide, or azobisbutyrylnitrile (AIBN), and thermal initiators sold under the trade name VAZO® by duPont deNemours and Company of Wilmington, Del. In the case of emulsion polymerization, water soluble initiators are preferred.

In some embodiments, the monomers and optional crosslinker are admixed, coated onto a tape backing or other support, and irradiated or heated to initiate polymerization. In some such embodiments, air is partially excluded or limited in the reaction area during the polymerization. In some such embodiments, UV or thermal polymerization is subjected to prepolymerization prior to coating onto the support and completing polymerization and/or crosslinking. Prepolymerization is a bulk or continuous polymerization method wherein a minor amount of polymerization, for example 1% to 10%, of the bulk coating composition is carried out to achieve a target viscosity. The prepolymers are of any suitable molecular weight and are soluble in the monomer mixture used to form the cationic or zwitterionic polymer. Prepolymers are formed in situ or added to a reaction vessel at any amount that is useful to provide the target coating viscosity. In a typical prepolymerization, a monomer mixture is subjected to UV or thermal radiation in bulk or continuous mode until the desired viscosity is reached, forming a prepolymerized mixture. In some embodiments, targeted viscosities for the prepolymerized coatings are from about 10 cP to 2000 cP, or about 100 cP to 1000 cP. In embodiments, one or more additional monomers, crosslinkers, initiators, or a combination thereof are then added to the prepolymerized mixture. In some embodiments, the one or more additional monomers, crosslinkers, initiators, or combination thereof include some or all of the same compounds, present in the same ratios, as those added to the mixture that is prepolymerized. The prepolymerized mixture is then coated onto the support and cured, wherein the viscosity of the prepolymerized mixture allows a thicker layer to be coated than would be practicable by coating without prepolymerization.

In other embodiments, an emulsion of monomer is formed and polymerization is carried out using UV or thermal initiation of the polymerization reaction. The emulsion is a water-in-oil or an oil-in-water emulsion. In some such embodiments, the emulsion is an oil-in-water emulsion, wherein the one or more monomers are stabilized in a bulk water phase by employing one or more surfactants. In various embodiments, the surfactant is cationic, anionic, zwitterionic, or nonionic in nature and is the structure thereof not otherwise particularly limited. In some embodiments, the surfactant is also a monomer and becomes incorporated within the cationic or zwitterionic polymer molecules. In other embodiments, the surfactant is present in the polymerization reaction vessel but is not incorporated into the cationic or zwitterionic polymer as a result of the polymerization reaction.

Non-limiting examples of anionic surfactants useful in forming oil-in-water emulsions of the monomers employed to form the cationic or zwitterionic polymers include ammonium, sodium, lithium, or potassium salts of lauryl sulfonic acid, dioctyl sodium sulfosuccinic acid, ammonium, sodium, lithium, or potassium salts of perfluorobutanesulfonic acid, ammonium, sodium, lithium, or potassium salts of perfluorooctanesulfonic acid, ammonium, sodium, lithium, or potassium salts of perfluorooctanoic acid, sodium dodecyl sulfate, sodium dodecylbenzenesulfonate, sodium laureth sulfate, sodium lauroyl sarcosinate, sodium myreth sulfate, sodium pareth sulfate, ammonium, sodium, lithium, or potassium salts of stearic acid, and combinations of one or more thereof.

Non-limiting examples of nonionic surfactants useful in forming oil-in-water emulsions of the monomers employed to form the cationic or zwitterionic polymers include block copolymers of ethylene oxide and propylene oxide, such as those sold under the trade names PLURONIC®, KOLLIPHOR®, or TETRONIC®, by the BASF Corporation of Charlotte, N.C.; ethoxylates formed by the reaction of ethylene oxide with a fatty alcohol, nonylphenol, dodecyl alcohol, and the like, including those sold under the trade name TRITON®, by the Dow Chemical Company of Midland, Mich.; oleyl alcohol; sorbitan esters; alkylpolyglycosides such as decyl glucoside; sorbitan tristearate; and combinations of one or more thereof.

Non-limiting examples of cationic surfactants useful in forming oil-in-water emulsions of the monomers employed to form the cationic or zwitterionic polymers include benzalkonium chloride, cetrimonium bromide, demethyldioctadecylammonium chloride, lauryl methyl gluceth-10 hydroxypropyl diammonium chloride, tetramethylammonium hydroxide, monoalkyltrimethylammonium chlorides, monoalkyldimethylbenzylammonium chlorides, dialkylethylmethylammonium ethosulfates, trialkylmethylammonium chlorides, polyoxyethylenemonoalkylmethylammonium chlorides, and diquaternaryammonium chlorides; the ammonium functional surfactants sold by Akzo Nobel N.V. of Amsterdam, the Netherlands, under the trade names ETHOQUAD®, ARQUAD®, and DUOQUAD®; and mixtures thereof. Of particular use in forming oil-in-water emulsions for polymerization of the zwitterionic polymers of the invention are the ETHOQUAD® surfactants, for example, ETHOQUAD® C/12, C/25, C/12-75, and the like. In some embodiments, ETHOQUAD® C/25 is usefully employed to make high solids emulsions in water of the monomers employed to make the zwitterionic polymers of the invention.

Where a cationic surfactant is employed in an oil-in-water emulsion polymerization reaction, it is employed in an amount of about 1.0 wt % to 6.0 wt % based on the total weight of the monomers, or at about 2.0 wt % to 4.0 wt % of the monomers, or in various intermediate levels such as 1.1 wt %, 1.2 wt %, 1.3 wt %, 1.4 wt %, 1.5 wt %, 1.6 wt %, 1.7 wt %, 1.8 wt %, 1.9 wt %, 2.1 wt %, 2.2 wt %, and all other such individual values represented by 0.1 wt % increments between 1.0 and 6.0 wt %, and in any range spanning these individual values in 0.1 wt % increments, such as 2.3 wt % to 4.6 wt %, 4.5 wt % to 4.7 wt %, and the like.

Non-limiting examples of zwitterionic surfactants useful in forming oil-in-water emulsions of the monomers employed to form the cationic or zwitterionic polymers include betaines and sultaines, such as cocamidopropyl betaine, hydroxysultaine, and cocamidopropyl hydroxysultaine; others include lecithin, 3-[(3-Cholamidopropyl)dimethylammonio]-1-propanesulfonate (CHAPS), and sodium 2-[1-(2-hydroxyethyl)-2-undecyl-4,5-dihydroimidazol-1-ium-1-yl]acetate (sodium lauroamphacetate). Where a zwitterionic surfactant is employed in an oil-in-water emulsion polymerization reaction, it is employed in an amount of about 1.0 wt % to 10.0 wt % based on the total weight of the monomers, or at about 2.0 wt % to 6.0 wt % of the monomers, or in various intermediate levels such as 1.1 wt %, 1.2 wt %, 1.3 wt %, 1.4 wt %, 1.5 wt %, 1.6 wt %, 1.7 wt %, 1.8 wt %, 1.9 wt %, 2.1 wt %, 2.2 wt %, and all other such individual values represented by 0.1 wt % increments between 1.0 and 10.0 wt %, and in any range spanning these individual values in 0.1 wt % increments, such as 2.3 wt % to 4.6 wt %, 4.5 wt % to 4.7 wt %, and the like.

In some embodiments, emulsion polymerization of the monomers employed to make the cationic or zwitterionic polymers of the invention is carried out by blending the monomers, surfactant(s), and a UV initiator in water, followed by irradiating with UV radiation at a wavelength corresponding to the preferred decomposition wavelength of the selected initiator for a period of time. In other embodiments, emulsion polymerization of the monomers employed to make the cationic or zwitterionic polymers of the invention is carried out by blending the monomers, surfactant(s), and a thermal initiator in water, followed by heating the emulsion to a temperature where decomposition of the thermal initiator is induced at a suitable rate. In some embodiments where methacrylic acid or acrylic acid are employed in the monomer mixture, sodium, lithium, ammonium, or potassium hydroxide is added to the monomer mixture to neutralize the acid functionality and form the corresponding salt. In other embodiments, such neutralization is carried out after completion of the polymerization reaction. Neutralization, in embodiments, means adjusting the pH of the water phase from between about 2 and 3 to between about 4 and 7, for example between about 5 and 6.

In some embodiments, ETHOQUAD® C/25 is usefully employed to make high solids emulsions of the monomers. In this context, "solids" are defined as all ingredients of the emulsion other than water. High solids emulsions are formed, for example, at about 15 wt % and 60 wt % total solids in water, or about 25 wt % to 60 wt % total solids in water, or about 30 wt % to 50 wt % solids in water, or in various intermediate levels such as 16 wt %, 17 wt %, 18 wt %, 19 wt %, 20 wt %, 21 wt %, 22 wt %, 23 wt %, 24 wt %, 26 wt %, 27 wt %, and all other such individual values represented by 1 wt % increments between 15 wt % and 60 wt % solids in water, and in any range spanning these individual values in 1 wt % increments, such as 23 wt % to 46 wt %, 45 wt % to 57 wt %, and the like.

In general, conditions of emulsion polymerization and methodology employed are the same or similar to those employed in conventional emulsion polymerization methods. In some embodiments, the oil-in-water emulsion polymerization is carried out using thermal initiation. In such embodiments, one useful polymerization initiator is V-50 (obtained from Wako Pure Chemical Industries Ltd. of Osaka, Japan). In some such embodiments, the temperature of the emulsion is adjusted prior to and during the polymerization to about 30° C. to 100° C., for example to about 40° C. to 80° C., or about 40° C. to 60° C., or about 45° C. to 55° C. Agitation of the emulsion at elevated temperature is carried out for a suitable amount of time to decompose substantially all of the thermal initiator, and react substantially all of the monomers added to the emulsion to form a polymerized emulsion. In some embodiments, elevated temperature is maintained for a period of about 2 hours to 24 hours, or about 4 hours to 18 hours, or about 8 hours to 16 hours. During polymerization, it is necessary in some embodiments to add additional thermal initiator to complete the reaction of substantially all of the monomer content added to the reaction vessel. It will be appreciated that completion of the polymerization is achieved by careful adjustment of conditions, and standard analytical techniques, such as gas chromatographic analysis of residual monomer content, will inform the skilled artisan regarding the completion of polymerization.

In other embodiments, the polymerization is a solvent polymerization, wherein the monomers form a solution in a solvent or mixture of two or more solvents. The solvents include water but in some embodiments a non-aqueous solvent or solvent mixture is employed. Examples of suitable solvents and solvent mixtures include, in various embodiments, one or more of ethanol, methanol, toluene, methyl ethyl ketone, ethyl acetate, isopropyl alcohol, tetrahydrofuran, 1-methyl-2-pyrrolidinone, 2-butanone, acetonitrile, dimethylformamide, dimethyl sulfoxide, dimethylacetamide, dichloromethane, t-butanol, methyl isobutyl ketone, methyl t-butyl ether, and ethylene glycol. In general, conditions of solvent polymerization and methodology employed are the same or similar to those employed in conventional solvent polymerization methods. In some embodiments, the solvent polymerization is carried out using thermal initiation. In such embodiments, one useful polymerization initiator is VAZO® 67. In some such embodiments, the temperature of the monomer solution is adjusted prior to and during the polymerization to about 30° C. to 150° C., for example to about 50° C. to 1300° C., or about 60° C. to 120° C., or about 60° C. to 100° C. Agitation of the solution at elevated temperature is carried out for a suitable amount of time to decompose substantially all of the thermal initiator, and react substantially all of the monomers to form a polymer solution. In some embodiments, elevated temperature is maintained for a period of about 2 hours to 24 hours, or about 4 hours to 18 hours, or about 8 hours to 16 hours. During polymerization, it is necessary in some embodiments to add additional thermal initiator to complete the reaction of substantially all of the monomer content added to the reaction vessel. It will be appreciated that completion of the polymerization is achieved by careful adjustment of conditions, and standard analytical techniques such as gas chromatographic analysis of residual monomer content will inform the skilled artisan regarding the completion of polymerization.

In some embodiments, the solvent polymerization as described above is a UV polymerization; that is, a UV initiator is employed instead of a thermal initiator and the polymerization is carried out substantially as described for the solvent polymerization except that the solution is irradiated with UV radiation at a wavelength corresponding to the preferred decomposition wavelength of the selected initiator for a period of time. In some embodiments, solution UV polymerization is carried out without adding heat to the solution. In other embodiments, heat is further added to the solution, for example to facilitate mixing as viscosity of the solution increases during the polymerization process.

Adhesive Compositions and Coating

The adhesive compositions of the invention include at least one cationic polymer or zwitterionic polymer, and optionally one or more additional components. Additional components include one or more adhesion promoters, tackifying agents, surfactants, antifouling agents, thermal or oxidative stabilizers, colorants, adjuvants, plasticizers, solvents, crosslinkers, or mixtures thereof.

In some embodiments, the cationic or zwitterionic polymer is precipitated from a polymerization emulsion mixture or otherwise purified to remove one or more of residual monomer, unreacted initiator, low molecular weight products, and surfactant, and the purified cationic or zwitterionic polymer is the adhesive composition. In other embodiments, the polymer is further compounded with one or more additional components, described below, to form the adhesive composition. The adhesive composition is then employed in an extrusion coating or dissolved in water or another solvent and solvent coated on a support to form a masking article as will be described below. In other embodiments, the emulsion is simply dried to form the adhesive composition, and the dried composition is extrusion coated or dissolved in a solvent other than water and coated onto a support; in some embodiments, one or more additional components are added via conventional compounding or addition processes to form the adhesive composition. Extrusion and solvent coatings are carried out using conventional methods such as those employed by the skilled artisan. Non-limiting examples of solvent coating processes useful in conjunction with the adhesive compositions of the invention include knife coating, slot coating, die coating, flood coating, rod coating, curtain coating, cast coating, spray coating, brush coating, dip coating, kiss coating, gravure coating, pattern coating processes such as stripe coating, print coating operations such as flexographic, inkjet, or screen print coating, and the like. Solvent coating is followed by drying using a suitable temperature and period of time for drying that is sufficient to remove a substantial portion of the solvent and any other volatile substances associated with the adhesive composition.

In some embodiments, an emulsified cationic or zwitterionic polymer, at the end of an emulsion polymerization process, is employed as the adhesive composition and is coated as-is onto one or more supports to form a masking article. In such embodiments, water and one or more surfactants employed in the polymerization will remain associated with the adhesive composition, along with any residual unreacted monomers or initiators. The adhesive composition is coated and dried for a period of time sufficient to remove a substantial portion of the water, but in most embodiments the surfactant(s) employed will remain in the dried coating whether or not such surfactants are reacted with and become part of the polymer. Drying of the emulsion will, in some embodiments, also result in removal of some portion or a substantial portion of any unreacted volatile monomers. In some embodiments, one or more additional components are added to the emulsion containing the cationic or zwitterionic polymer to form the adhesive composition, and the amended emulsion is employed to coat one or more supports and dried to remove a substantial portion of the water and some or a substantial portion of any other remaining volatile components. After drying, it is desirable that the emulsified adhesive compositions include no more than 1 wt %, for example between 0.5 wt % and 5 ppm, or between about 500 ppm and 10 ppm, or between about 100 ppm and 1 ppm of unreacted monomers, based on the total weight of monomers added to the emulsion polymerization reaction vessel.

Cationically emulsified adhesive compositions of the invention are characterized by excellent coating viscosity and high shear stability. In embodiments, the viscosity of a cationically stabilized adhesive composition of the invention is between about 20 cP and 2500 cP, or about 100 cP and 1500 cP, or about 400 cP to 1000 cP. The emulsion viscosity is determined in part by the solids content of the emulsion and the molecular weight of the cationic or zwitterionic polymer formed. The emulsions are stable under shear stress, such that onset of shear instability occurs at or above at least about 80 Pa, for example between about 90 Pa and 300 Pa, or about 100 Pa and 200 Pa. The viscosity and shear stability of the cationically emulsified adhesive compositions of the invention provide broad flexibility in selecting coating methods for coating the adhesive compositions onto one or more supports to form a masking article. Non-limiting examples of useful coating processes employed in conjunction with the cationally emulsified adhesive compositions include knife coating, slot coating, die coating, flood coating, rod coating, curtain coating, spray coating, brush coating, dip coating, kiss coating, gravure coating, print coating operations such as flexographic, inkjet, or screen print coating, and the like. In some embodiments the adhesive compositions are coated as a continuous coating; in other embodiments they are pattern coated as described in U.S. Pat. Nos. 4,798,201 and 5,290,615 or using another technique.

Coating of the emulsified adhesive compositions is followed by drying using a suitable temperature and period of time for drying that is sufficient to remove a substantial portion of the water and any other volatile substances associated with the emulsion mixture.

Adhesive Articles

The adhesive articles of the invention include at least an adhesive composition of the invention and a support. Coating of the adhesive compositions onto one or more supports is generally described above. It is an advantage of the invention that adhesive articles of the invention are easy to make, in many embodiments employing a single pass coating operation to fabricate an adhesive article. In embodiments where the adhesive composition is coated as an emulsion or from a solvent, the single coating pass is followed by a drying step. No additional steps are required in order to fabricate an adhesive article of the invention. Most significantly, the adhesive articles of the invention are characterized by the absence of an edge treatment; the adhesive articles have a constant composition over the entirety of the coated support. However, performance of the adhesive articles in masking applications is commensurate with or superior to that of conventional edge treated masking articles.

While the adhesive articles of the invention are not particularly limited as to type and shape of the support, in many embodiments the support is a sheet or film suitable for converting to a tape article. Tape articles are rectangular strips that typically are converted from larger sheets into the desired width and length. Such conversion is typically carried out after coating the adhesive compositions onto the tape film or sheet. Thus, when the masking article is to be a tape article, critical variables in the adhesive coating process are film or sheet thickness of the support and chemical composition of the support in conjunction with the nature of the adhesive composition to be coated, including whether the coating is an emulsion coating, solvent borne coating, extrusion coating, or UV curable monomeric or prepolymerized coating.

It is an advantage of the invention that the adhesive articles of the invention are masking articles, whether or not they are used as such. In order to be used as a masking article, any of the adhesive articles described herein are useful as such with no further modification.

In some embodiments, the adhesive article is not a tape. An adhesive article is employed in any form or shape, including non-rectilinear shapes and irregular shapes. In other embodiments, the adhesive article is a tape article. Supports employed in forming tape articles of the invention are between about 12 μm and 3 cm thick, for example about 25 μm to 200 μm or 75 μm to 150 μm thick for a "standard" dimension tape article, and between 200 μm and 3 cm for specialized tape articles. Specialized tape articles include articles including a foamed support, for example.

Chemical composition of suitable tape supports include those selected from a wide variety of polymers and blends thereof. Non-limiting examples of suitable tape supports include paper, including both flat or smooth paper as well as textured paper such as crepe paper, natural or synthetic polymer films, nonwovens made from natural and/or synthetic fibers and combinations thereof, fabric reinforced polymer films, fiber or yarn reinforced polymer films or nonwovens, and multiple layer laminated constructions. Examples of suitable synthetic polymer films include those made from polyolefins such as polyethylene or polypropylene, polyvinyl chloride, polytetrafluoroethylene and copolymers thereof with fluorinated and non-fluorinated monomers, polyvinylidene chloride and copolymers thereof, polyvinylidene fluoride and copolymers thereof, polyamides such as nylon 6, nylon 6,6, and nylon 12, polyesters such as polyethylene terephthalate, polylactic acid, and polyethylene naphthalate, polyimides, polyurethanes, polyacrylic esters, polycarbonates, and the like, and blends of two or more such materials. Such support materials include, in some embodiments, additional materials such as fillers, stabilizers, colorants, and the like. Metal supports, such as tin or aluminum film or sheet supports, are also useful in some embodiments. In some embodiments the polymers forming the support are in the form of a foam support. In some embodiments the support is a metalized film. In some embodiments the support is a multilayered support having two or more layers; in some such embodiments the layers are laminated. Combinations of two or more such compositions and constructions are also useful in various embodiments of the invention.

In some embodiments the support is embossed or microembossed; embossed or microembossed supports include any of the support materials and constructions described above. In some such embodiments, embossed or microembossed features are disposed on the major side of the support contacting the adhesive composition. In other embodiments the embossed or microembossed features are disposed on the major side of the support opposite to the side coated with the adhesive composition. In still other embodiments embossed or microembossed features are disposed on both major sides of the support; the features disposed on the two major sides are the same or different in various embodiments. In some embodiments, the adhesive composition itself includes embossed features, either by virtue of being coated on an embossed surface, or by disposing an adhesive composition between the support and an embossed release liner. Embossed features imparted to the adhesive compositions themselves are useful, for example, to impart repositionability to the masking articles of the invention or allow for air bleed from between the adhesive article and the masked surface. Embossing and microembossing are accomplished using techniques known to the skilled artisan and include nip roll embossing using a patterned nip roll, and profile extrusion; secondary processes such as tentering and slicing are further employed in some embodiments to modify surface structures imparted by the embossing or microembossing process.

The materials that constitute the support are not particularly limited, and the same materials useful as tape supports are similarly useful in the form of supports other than films or sheets. In various embodiments, such supports are usefully combined with the adhesive compositions of the invention to make adhesive articles other than tapes. In some such embodiments the adhesive articles are masking articles. In other embodiments, the adhesive articles are not used in a masking application. Adhesive articles usefully formed by coating with the adhesive compositions of the invention include, for example, roofing shingles, carpet squares, carpet backings, vinyl flooring squares, adhesive wall tiles, wallpapers, decorative decals or stickers, automobile detailing features or decals, and plastic or rubber "bumps" employed as feet, spacers, stops, or protectors on various articles, and any number of other applications where pressure sensitive adhesives are usefully employed. Additional materials such as glass or some rigid/brittle plastics or metals that are not traditionally used as tape supports also have utility as some in some applications in conjunction with the adhesive compositions of the invention.

The width and length of the adhesive articles of the invention are not particularly limited. In some embodiments, the adhesive articles of the invention are converted to tape articles by slicing a coated sheet or film to widths of between about 0.25 cm and 10 cm, in some embodiments between about 0.5 cm and 7.6 cm; however, the width of a tape article is not particularly limited. Additionally, in some embodiments, the adhesive articles of the invention are suitably converted to small sheets, for example 20 cm by 28 cm sheets, for use by a consumer. In some embodiments, sheets are provided to a consumer who is then free to divide the sheet into the desired shape and dimensions for use in a specific application.

It is an advantage of the invention that the adhesive articles of the invention are masking articles, whether or not they are used as such. In order to be used as a masking article, any of the adhesive articles described are useful as such with no further modification. The adhesive articles do not require an edge coating or other edge treatment prior to using the adhesive article in a masking application. Thus, while the necessity of adding an edge treatment effectively limits the utility of edge-treated tapes to rectangular shapes, wherein the edge treatment is efficiently applied in a manufacturing process, such a limitation does not exist with the masking articles of the invention. Therefore, the shapes easily utilized in conjunction with the supports onto which the adhesive compositions of the invention are coated are virtually unlimited in terms of ease of manufacturing and even ease of the end user in converting one supplied shape to a customized shape, for example by hand cutting with scissors, a box cutter, a hole punch, a die cutter, or any other cutting implement. Thus, for example, a consumer could buy a 20 cm by 28 cm sheet of a masking tape of the invention and cut it into the desired shape for a specific end use. Such end uses include, for example, stenciling or patterning wherein the adhesive article is employed to mask an area to be painted and is removed after the paint is applied.

In some embodiments, prior to coating and drying the adhesive compositions of the invention on the support, the support is pre-treated. Pre-treatments are applied to, or carried out on, the major surface of the support onto which the adhesive composition will be coated, when an increase in the adhesive bonding between the support and the adhesive composition is necessary to prevent failure of the support-adhesive interface when a tape article or other masking article is removed from the surface onto which it was applied in use. Pre-treatments include coatings applied to the support surface. One of skill will understand that the nature of such "primer" coatings is specific to each support and specific adhesive composition, and a wide variety of such primer coatings are available—in fact, some support materials are available pre-primed for this purpose. Another type of suitable pre-treatment is roughening the surface of the support prior to coating, which increase surface area for adhesion by the coated adhesive compositions of the invention. Yet another type of suitable pre-treatment is corona or plasma treatment of the surface to induce chemical changes that can increase adhesion of the adhesive compositions of the invention to the support. While such pre-treatments are useful in some embodiments, it is an advantage of the cationically emulsified adhesive compositions of the invention that many suitable supports, including paper, polyethylene terephthalate, and polycarbonate, are coated with the compositions in the absence of any type of pre-treatment to improve bonding at the support-adhesive interface.

In some embodiments where the adhesive article is a tape, the major side opposite the side of the support onto which the adhesive composition will be coated is treated in order to facilitate release of the adhesive from the major side opposite to the adhesive-coated side during unwinding of the tape by the end user. Such coatings, often termed "low adhesion backsize" or LAB in the industry, are well known by those of skill and any of the conventionally employed LAB treatments and coatings are suitably applied to the tape supports employed to form the masking tape articles of the invention. We have found that such conventional LAB treatments are suitably employed in various embodiments of the invention to provide tape articles having conventional values of unwind force, for example between about 50 g/cm to 500 g/cm, or about 100 g/cm to 350 g/cm when measured at 180° peel at a rate of 228.6 cm/min and set time of 5 seconds.

In some embodiments, the adhesive article includes a release liner. For example, in some embodiments, it is desirable to form the adhesive article in sheet form, or it is useful for some other reason to avoid having the adhesive article wound upon itself as is commonly done with adhesive tapes. For example, if the end use is a stenciling application, it is generally desirable to employ a release liner—that is, a separate support-type sheet or film—applied to the coated and dried adhesive composition residing on the support. In such embodiments, the support is coated on one major side thereof with the adhesive composition, the adhesive composition is dried if necessary, and a release liner is applied on top of the dried adhesive layer. The release liner is formed from, or coated with, a material that releases cleanly from the adhesive when peeled off by the end user, in embodiments transferring substantially no residue of the release liner material on or in the adhesive. Such release liners are well known by those of skill and any of the conventionally employed release liners are suitably applied to the tape supports employed to form the masking tape articles of the invention.

In embodiments where the adhesive article is a tape article, the adhesive compositions of the invention are coated onto the selected support at coating weights of about 5 g/m$^2$ to 90 g/m$^2$ of the dried adhesive composition on the support, or about 10 g/m$^2$ to 70 g/m$^2$, or about 15 g/m$^2$ to 50 g/m$^2$ of the dried adhesive composition on the support. However, it will be understood that the adhesive articles of the invention are not limited to masking tape articles or to masking applications, and for various applications a thicker or thinner coating of the adhesive is useful and is easily optimized by one of skill.

In some embodiments, the adhesive articles of the invention are edge coated adhesive articles. In some such embodiments, the adhesive compositions of the invention are employed as an edge coating in conjunction with an additional adhesive material on a support. The additional adhesive material is not particularly limited compositionally, but in some embodiments is a conventional masking tape adhesive or other pressure-sensitive adhesive. In other embodiments the additional adhesive is an adhesive composition of the invention that differs compositionally from the edge coated composition. Thus, in embodiments, the major side of a support onto which an additional adhesive is coated is further coated at the edges of the same major side thereof with an adhesive composition of the invention. In some such embodiments, the additional adhesive covers the entirety of the major side, and an adhesive composition of the invention is coated on top of the additional adhesive. In other such embodiments, the additional adhesive does not cover the entire width of the major side and the adhesive compositions of the invention are coated contiguous (side-by-side in touching relation to the additional adhesive. In still other embodiments, the additional adhesive and the adhesive composition of the invention are coated discontinuously, wherein the two adhesive materials do not contact each other. In any such embodiment, the two adhesive materials are suitably coated either contemporaneously or stepwise, in a single pass coating or in two separate passes.

It will be understood that some of the edge coated adhesive articles disclosed above, for example the contiguous or discontinuous coatings, usefully employ the adhesive compositions of the invention because the compositions are pressure-sensitive adhesives, unlike conventional edge coatings. For example, some conventional edge coatings are superabsorbents that are not pressure sensitive adhesives. Such edge coatings are not suitably employed, e.g., in a discontinuous or contiguous coating relative to a conventional masking tape adhesive, because the superabsorbent will not adhere to the masked surface and thus will not provide the protection afforded by the pressure sensitive adhesives of the invention.

In some embodiments, the edge coated adhesive articles of the invention have no additional adhesive material coated onto the support. That is, the adhesive compositions of the invention are coated discontinuously on a major side of a support onto which no additional adhesive is coated. Pattern coating and stripe coating, as described above, are useful in some embodiments to provide an "edge-coated only" adhesive article wherein one or both edges of a tape support are coated with the adhesive composition. Such articles have pressure sensitive adhesive performance over only a portion of the major side that contacts a surface in a masking application, and no adhesion at all over the remainder thereof. In some embodiments, edge-coated only adhesive articles reduce the total amount of coated material per unit of area in forming the tape construction. In some embodiments, an edge-coated only adhesive article has a reduced adhesive force per unit of tape area, which in turn aids in removing the article from a surface after application. In some embodiments, by using an edge-coated only masking article, a surface can effectively be masked wherein adhesive does not contact, e.g., a very delicate portion of the surface. Such articles are useful, for example, in highly sensitive applications such as artwork restoration, painting of surfaces contiguous to delicate fabrics, painting of surfaces contiguous to very old woodwork having an original finish, or protecting semiconductor surfaces during coating processes. Because in such edge-coated only articles the edge coating is itself a pressure sensitive adhesive, such masking articles can be formed.

An additional advantage of the edge coated adhesive articles of the invention is that the adhesive force of the edge coating (as evidenced by, e.g., peel adhesion level) is easily adjusted in the same manner as described above for the supports coated entirely with the adhesive compositions of the invention. Thus, for example, a masking article is easily formed wherein the edges of the coated major side thereof have a greater or lesser amount of adhesive force to the intended substrate compared to the additional adhesive disposed on at least a portion of the remainder of the major side. Similarly, a masking article is easily formed wherein the edges of the coated major side thereof have a greater or lesser amount of tack compared to the additional adhesive disposed on at least a portion of the remainder of the major side.

In various embodiments, the edge coated adhesive articles are suitably coated with the adhesive compositions of the invention at coating weights of about 1 g/m$^2$ to 90 g/m$^2$ of the dried adhesive composition, or about 5 g/m$^2$ to 70 g/m$^2$, or about 10 g/m$^2$ to 50 g/m$^2$ of the dried adhesive composition. However, it will be understood that the edge coated adhesive articles of the invention are not limited to masking tape articles or to masking applications, and for various applications a thicker or thinner coating of the adhesive composition is useful and is easily optimized by one of skill. Further, the width of the edge coating is not particularly limited; that is, the distance between the outer edge of the major coated surface and the inner edge of the edge coating can encompass any percent of the total width of the support that is less than 100%. In many embodiments, the edge coating encompasses between 5% and 50% of the total width of the support.

Examples of conventional masking tapes that are suitably edge coated with the adhesive compositions of the invention include SCOTCHBLUE® 2080 or 2090, available from the 3M Company of St. Paul, Minn.

Edge coating of the adhesive compositions is suitably carried out using any method known to those of skill. For example, stripe coating, knife coating, brush coating, kiss coating, die coating, or curtain coating are useful means to apply the adhesive compositions of the invention to the edges of a support.

Applications of the Adhesive Articles

In various embodiments, the adhesive articles of the invention are applied to a selected substrate, whereupon the adhesive composition performs as a pressure sensitive adhesive. Pressure-sensitive adhesives are recognized as a standard class of materials. Pressure-sensitive adhesives are generally recognized as having tack at temperatures ranging between about 15° C. to 25° C. and adhesion to a variety of dissimilar surfaces upon mere contact without the need for more than manual pressure. Pressure sensitive adhesives require no activation by water, solvent or heat in order to exert a strong adhesive holding force towards materials such as paper, cellophane, glass, plastic, wood and metals. Pressure sensitive adhesives have a sufficiently cohesive holding and elastic nature that, despite their aggressive tackiness, they can be handled with the fingers and removed from smooth surfaces without leaving a substantial residue (see, e.g., Test Methods for Pressure-Sensitive Tapes, 6th Ed., Pressure Sensitive Tape Council, 1953). Pressure sensitive adhesives and tapes are well known, and the wide range and balance of properties desired in such adhesives has been well analyzed (see, e.g., U.S. Pat. No. 4,374,883; and "Pressure-Sensitive Adhesives" in Treatise on Adhesion and Adhesives Vol. 2, "Materials," R. I. Patrick, Ed., Marcel Dekker, Inc., N.Y., 1969).

Substrates on which the adhesive compositions of the invention have good performance as a pressure sensitive adhesive, when combined with a suitable support in an adhesive article, include, but are not limited to, glass, metal, wood (including wood products such as cardboard or particleboard), wallboard, synthetic or natural polymers including filled, colored, crosslinked or surface-modified polymers including, for example, polyvinyl chloride, polyesters such as polyethylene terephthalate or polylactic acid, natural or synthetic rubber, polyamides, polyolefins such as polyethylene or polypropylene, appliance or equipment casing materials such as acrylonitrile-butadiene-styrene (ABS) copolymers, polycarbonate, polymethyl methacrylate, and the like; and mixed or composite materials such as polymer-wood composites, and the like, and any painted or primed surface thereof. Additionally, it is a feature of the adhesive compositions of the invention that adhesion to a selected surface is easily optimized to a desired level while maintaining the level of cationic and/or anionic monomer present in the cationic or zwitterionic polymer. For example, it is possible to adjust adhesion, as measured by PSTC-101, Test Method A (Harmonized International Standard, Peel Adhesion of Pressure Sensitive Tape; available at http://www.pstc.org/files/public/101.pdf), between about 50 g/cm and 450 g/cm using a constant level of cationic monomer and varying the type and ratio of the other monomers in the cationic or zwitterionic polymer.

Once applied to the selected substrate surface, the adhesive articles of the invention are usefully employed in one or more masking applications. The performance of the adhesive articles of the invention as masking articles is characterized by the interaction of the adhesive compositions of the invention with the liquid and/or liquid-borne solid materials applied to the masked substrate, wherein the interaction results in the substantial prevention of contact by the liquid or liquid-borne materials with the masked surface. To use the masking article to produce sharp, clean, smooth lines of separation between a masked substrate, which is shielded from a coating, and the unmasked region of the substrate to which a liquid coating is applied, the adhesive article is first adhered to the region of the substrate be shielded from the coating. Next, the coating is applied to the unmasked region of the substrate and applied to at least the edge of the adhesive article. The coating is then allowed to at least partially dry. Last, the adhesive article is removed from the substrate. Because the adhesive article inhibits the migration of the coating beyond the edge of the masked surface, a clear even line of demarcation is produced between the coated region of the substrate and the masked surface of the substrate.

In many masking applications, the liquid coating applied to the masked substrate is a paint formulation. Paint formulations are solid, semisolid, or liquid particles dispersed in a suspension, i.e., a dispersion or an emulsion, typically though not always an aqueous suspension. In many embodiments, paint formulations are emulsions that are anionically stabilized. In some such embodiments, a paint formulation is a waterbased latex including one or more anionically charged water soluble polymers and dispersed inorganic pigment particles, wherein the pigment particles are kept in a dispersed state by stabilizing effect of the one or more water soluble polymers. In other embodiments, the paint is a waterbased latex formed by stabilizing pigment particles with one or more anionically charged surfactants in addition to one or more water soluble polymers. In such embodiments, the adhesive compositions of the invention inhibit the flow of the paint formulation components onto the masked surface, which is the portion of the masked substrate contacting the adhesive composition. The adhesive composition impedes this flow by destabilizing the paint formulation, either by inducing aggregation of particles within the paint formulation, or by increasing the viscosity of the paint formulation, both of which mechanisms tend to form a barrier that impedes, or otherwise inhibits, the migration of the paint formulation beyond the edge of the interface of the masked substrate and the adhesive composition. The cationic monomer present in either the cationic polymer or the zwitterionic polymer of the adhesive composition interacts with the anionic moieties of the paint formulation, causing the observed effect.

In some embodiments, a liquid coating—whether a paint formulation or some other liquid coating material—is cationically stabilized instead of anionically stabilized such as the paint formulations described above. It is a feature of the invention that in embodiments wherein the adhesive article includes a zwitterionic polymer, such cationically stabilized liquid coating compositions are effectively masked in the same manner as an anionically stabilized waterborne latex is stabilized. That is, the anionic monomers present in the zwitterionic polymer induce aggregation by destabilization, or induce an increase in viscosity, by interaction of the anionic monomers with the cationic moieties present in the latex.

It is a feature of the adhesive articles of the invention that, because of the absence of an edge treatment, that adhesion upon application to the selected substrate is always constant across the entire adhesive article. Edge treatments of the prior art masking tapes can affect adhesion where the tapes are applied and cause adhesion to be greater or lesser at the edges than over the remainder of the edge treated tape. Greater adhesion to the substrate can cause the tape to leave residue upon removal or prevent effective removal altogether, or even cause damage to the underlying substrate upon attempted removal. Lesser adhesion at the edges can cause lack of sufficient adhesion to the substrate, leading to loss of barrier properties at the edges of the tape and defeating the purpose of the edge treatment. The adhesive articles of the invention do not have differential adhesion at the edges because the adhesive composition itself is the barrier material and the barrier material is present over the entire contact area of the adhesive composition and the masked surface.

Additionally, the masking performance of the adhesive compositions of the invention is characterized by the substantial absence of any absorption of the liquid coating applied to the masked substrate. That is, the adhesive articles do not perform in masking applications by absorbing liquid. Testing of masking tape articles reveals no measurable swelling of the adhesive compositions when an adhesive article of the invention is applied to a substrate and the substrate is coated with waterbased paint formulations. The masking properties of the adhesive compositions are therefore not achieved by any absorptive phenomena.

The masking properties of the adhesive articles of the invention work to produce paint lines that have a lower degree of variability around a center line defined by the edge of the masked surface than an edge defined by a conventional masking tape. That is, all other variable remaining constant, an edge of a masked surface formed by applying an adhesive article of the invention on a selected substrate will produce a paint line having a lower degree of variability around a center line than an edge provided by a standard masking tape. The center line and degree of variability can be determined using known statistical techniques such as the method of least squares, linear regression, and analysis of variance. Additionally, the masking properties of the adhesive articles of the invention work to produce paint lines that have the same or lower degree of variability around a center line defined by the edge of the masked surface than an edge defined by a masking tape having an edge treatment. That is, all other variable remaining constant, an edge of a masked surface formed by applying an adhesive article of the invention on a selected substrate will produce a paint line having the same or lower degree of variability around a center line than an edge provided by a commercial edge-treated masking tape.

Another aspect of the masking application is removal of the masking article after the coating operation(s) are carried out. It is a feature of the adhesive articles of the invention that regardless of the substrate onto which the adhesive article is applied, removal is substantially clean—that is, there is no observable residue left upon removal of the article, and there is no damage to the substrate as a result of removing the adhesive article. Importantly, there is no observable residue left around the masked surface at the edge of the masked surface when the adhesive articles of the invention are removed from a substrate after carrying out a masking application. Without wishing to be limited by theory, we believe clean removal of the adhesive articles of the invention is due in part to maintenance of a high cohesive strength of the adhesive composition and high adhesive bonding between the adhesive composition and the support over the entirety of the adhesive article and further throughout application, masking, and removal of the adhesive article. Additionally, while not wishing to be limited by theory, we believe that preventing the migration of the liquid coating applied in a masking operation into the interface defined as the masked surface, and preventing absorption of any liquid as a means of preventing said migration, results in maintaining the integrity of the adhesive article throughout the masking application and results in easy, clean removal from the substrate after the masking is accomplished.

In order that the invention described herein can be more fully understood, the following examples are set forth. It should be understood that these examples are for illustrative purposes only, and are not to be construed as limiting this invention in any manner.

EXPERIMENTAL

Compounds

The following compounds, used in the various Examples, are referred to below using the abbreviations indicated in Table 1.

TABLE 1

Abbreviations and sources for compounds employed in the Examples.

| Abbreviation | Compound | Source |
|---|---|---|
| DMAEA-C$_1$Cl | Dimethylaminoethyl acrylate methyl chloride (2-trimethylammoniumethyl acrylate chloride) | CIBA, Marrietta, GA |
| DMAEMA-C$_{16}$Br | Dimethylaminoethyl acrylate hexadecyl bromide | See Example |
| VAc | Vinyl Acetate | Celanese Corp., Dallas, TX |
| MA | Methacrylic acid | BASF Corp., Ludwigshafen, Germany |
| AA | Acrylic acid | BASF Corp. |
| NVP | N-vinylpyrrolidinone | ISP Chemicals, Inc., Calvary City, KY |
| IBMA | Isobutyl methacrylate | Lucite International, Inc., Cordova, TN |
| HPA | Hydroxy propyl acrylate | Cyro Industries, Parsippany, NJ |
| ODA | Octadecyl acrylate | Cytec Industries, Inc., Woodland Park, NJ |
| STA | Stearyl acrylate | Polysciences, Inc., Warrington, PA |
| SiMac (MW) | Polydimethylsiloxane methacrylate; MW is for siloxane portion of monomer | Shin Etsu, Tokyo, Japan |
| EtOH | Ethanol | J. T. Baker; Austin, TX |
| BHT | 2,6-Di-tert-4-methyl phenol | Sigma-Aldrich Co. |
| MEHQ | Hydroquinone monomethyl ether | Alfa Aesar |
| VAZO®-67 (V-67) | 2,2-Azobis(2-methylbutyronitrile) | E. I. du Pont de Nemours and Co., Wilmington, DE |
| V-50 (V-50) | 2,2'-Azobis(2-methylpropionamidine) dihydrochloride | Wako Pure Chemical Ind., Ltd., Osaka, Japan |
| ETHOQUAD® C/25 | Cocoalkylmethyl[polyoxy-ethylene (15)] ammonium chloride | Akzo Nobel N.V., Amsterdam, the Netherlands |

General Procedures

Procedure A. Polymer Synthesis—Water

A clean reaction bottle is charged with 84 parts by weight of the desired monomer mixture, 0.5 parts of V-50 (obtained from Wako Pure Chemical Ind., Ltd., Osaka, Japan), and 300 parts of water. This mixture is purged with nitrogen for 3 minutes. The reaction bottle is sealed and placed in a 50° C. preheated water bath with a tumbling mechanism, and tumbled for 17 hours. Then the bottle is removed from the water bath and another 0.1 parts of V-50 is added to the bottle, and the bottle is purged and sealed as before. The bottle is placed back in the 50° C. water bath and tumbled for an additional 8 hours. In a typical reaction, percent solids analysis revealed about <0.5% unreacted monomer; that is, about >99.5% conversion of monomer.

Procedure B. Polymer Synthesis—Ethanol

A clean reaction bottle is charged with 60 parts by weight of the desired monomer mixture, 0.5 parts of VAZO® 67 (obtained from duPont deNemours and Co. of Wilmington, Del.), and 40 parts of ethanol. This mixture is purged with nitrogen for 3 minutes. The reaction bottle is sealed and placed in a 65° C. preheated water bath with a tumbling mechanism, and tumbled for 17 hours. Then the bottle is removed from the water bath and another 0.1 parts of VAZO® 67 is added to the bottle, and the bottle is purged and sealed as before. The bottle is placed back in the 65° C. water bath and tumbled for an additional 8 hours. In a typical reaction, percent solids analysis revealed about <0.5% unreacted monomer; that is, about >99.5% conversion of monomer.

Procedure C. Polymer Synthesis—Emulsion

A clean reaction vessel is charged with 40 parts by weight of the desired monomer mixture, 60 parts by weight of water, and 2 parts by weight of ETHOQUAD® C-25 (obtained from Akzo Nobel N.V. of Amsterdam, the Netherlands). This mixture is stirred and purged with nitrogen throughout the reaction. The mixture is heated to 50° C., then an initiator mixture is added in a single addition to the vessel. The initiator mixture consists of 0.5 parts by weight of V-50 (obtained from Wako Pure Chemical Ind., Ltd., Osaka, Japan) and 2 parts by weight of water. After addition of the initiator mixture, the reaction vessel is stirred at 50° C. for about 8 hours, then another 0.1 parts by weight of the initiator mixture is added to the reaction vessel. The vessel is stirred at 50° C. for an additional 4 hours, and then a sample is removed and analyzed using gas chromatography to determine the amount of unreacted monomer. If less than 0.5 parts of unreacted monomer is present, the mixture is allowed to cool to room temperature.

In some cases, where the monomer mixture contains acrylic acid and/or methacrylic acid, the cooled mixture is stirred and a 10% aq NaOH, KOH, LiOH or an amine solution is added, to adjust the final pH to between about 4-7. Neutralization is noted where carried out.

Procedure D. Laboratory Scale Coating of Polymer on a Support

Polymers synthesized as described in Procedures A, B, or C above are coated onto masking tape type supports for testing. Coating of the reaction mixtures are carried out as-is, that is, without isolation or any purification of the polymers synthesized. The reaction mixtures are knife coated onto the primed side of a 15.24 cm (6 inch) wide paper substrate 5.4 mil (0.14 mm) thick unless otherwise stated, having a density of 4.9 g/m$^2$ unless otherwise stated, and saturated with a suitable saturant, pretreated on one side with a suitable primer, and treated on the reverse side with a suitable LAB, targeting a coating weight of about 2.93 g/cm² to 3.14 g/cm² for the dry composition. After coating, the coated supports are dried by placing in a forced convection floor modeloven (obtained from Despatch Industries of Minneapolis, Minn.) set to 93° C. for about 5 minutes. The coated, dried supports are referred to as masking tape or masking tape articles.

Procedure E. Pilot Scale Coating of Polymer on a Support

Polymers synthesized as described in Procedures A, B, or C above are coated onto masking tape type supports to create rolls of tape for testing. Pilot scale coating of the reaction mixtures are carried out as-is, that is, without isolation or any purification of the polymers synthesized. The reaction mixtures are knife coated onto the primed side of a 15.24 cm (6 inch) wide paper substrate 5.4 mil (0.14 mm) thick unless otherwise stated, having a density of 4.9 g/m² unless otherwise stated, and saturated with a suitable saturant, pretreated on one side with a suitable primer, and treated on the reverse side with a suitable LAB, targeting a coating weight of about 2.93 g/cm² to 3.14 g/cm² for the dry composition. Coated webs were dried using a 3-Zone air floatation oven with temperatures set to 150° F., 175° F. and 250° F. respectively. Zone lengths were 9 feet, 9 feet and 18 feet and the web speed was set at 15 feet per minute for all runs. Rolls of the coated, dried supports are referred to as masking tape or masking tape articles.

Procedure F. Testing of Masking Articles

The masking tapes are subjected to one or more of a variety of tests. Not every test is carried out on every masking tape. Control tapes used for comparison in various tests in include the following, as abbreviated C1-C5 in the tests below. Not every test employs every control tape.

C1: SCOTCH-BLUE® 2020, available from 3M Company, St. Paul, Minn.

C2: SCOTCH-BLUE® 2080, available from 3M Company, St. Paul, Minn.

C3: SCOTCH-BLUE® 2090, available from 3M Company, St. Paul, Minn.

C4: SCOTCH-BLUE® 2093, available from 3M Company, St. Paul, Minn.

Peel adhesion of the masking tapes is measured using the procedure of PSTC-101, Method A using glass or stainless steel substrates.

Transfer of adhesive to a substrate—that is, the amount of adhesive that remains on a substrate after removing the tape—is measured visually using the criteria set forth in Table 2. Substrates include glass and wallboard. Adhesive transfer is measured after a peel adhesion testing or after paint testing.

TABLE 2

System used for scoring adhesive transfer to a substrate after tape removal.

0 No observable adhesive residue on substrate
1 Less than 3 small patches of adhesive remain on substrate
2 Adhesive observed on substrate in 3-10 spots
3 Adhesive observed on substrate in >10 spots
4 Adhesive observed over entire taped area after removal from substrate
5 All adhesive remains on substrate, plus tape support is split upon attempted removal Paint testing of the masking tapes is carried out on glass or wallboard. Surface preparation for glass is carried out by identifying the non-Sn (non-tin) side of a new 20.3 cm (8 inch) by 30.5 cm (12 inch) glass panel using a black light, and cleaning the non-Sn side of the glass panel with one wipe each of diacetone alcohol, heptane, and ethanol (in the stated order) prior to testing; tape is applied to the cleaned surface. The wallboard substrates are wiped with a dry cloth wipe prior to use, coated with one layer of latex primer followed by one layer of white latex paint. Painted wallboard substrates were allowed to dry prior to tape application.

A 20.3 cm (8 inch) long strip of tape is gently applied by hand to the substrate. A 2.04 kg (4.5 pound), 4.45 cm (1.75 in) wide, calibrated rubber roller is centered horizontally relative to the width of the tape and the roller is passed lengthwise back and forth by hand two times, for a total of four individual passes over the tape at a rate of approximately 30.5 cm (12 inches) per minute for a total of two passes. For testing on glass, paint is applied to the tape sample using a paint brush and within 15 minutes of applying the tape to the panel. For testing on wallboard, paint is applied by paint roller, rolling in the direction of the tape, and after a minimum of 1 hour after the tape is applied to the panel. For both glass and wallboard, the painted test panels are then allowed to dry at room temperature. Test paint used on glass is Sun Proof Exterior House & Trim Semi-Gloss Latex 100% Acrylic black paint #78-851, available from Pittsburgh Paints, PPG Industries, Pittsburgh, Pa. ("PPG"). Test paint used on wallboard includes, but is not limited to: Sherwin Williams Duration in black matte ("SW Dur") available from the Sherwin Williams Co. of Cleveland, Ohio) Sherwin Williams Emerald in black matte ("SW Emerald", available from the Sherwin Williams Colo.), Behr Premium Performance Ultra in black flat ("Behr PPU", available from Behr Paint Corporation of Santa Ana, Calif.), and Valspar Signature High Definition in black eggshell ("Valspar SHD", available from Valspar Corporation of Minneapolis, Minn.). Three replicates of each tape sample are tested. Approximately 15 feet of tape is removed from the tape roll between each test sample.

After the paint is completely dry, the paint line performance for the tapes is evaluated visually. The term used for observed encroachment of paint beyond the edge of the masking tape after coating with the paint indicated is "bleed". The amount of observable bleed on a glass or wallboard substrate is rated according to Table 3. Intermediate scores between numbers, such as 0.5 or 2.5, are also noted where appropriate.

TABLE 3

System used for scoring paint lines.

0 no observable bleed, acceptable paintline
1 Minimal bleed, acceptable paintline
2 Some bleed, may still be an acceptable paintline
3 Considerable bleed, not an acceptable paintline
4 Excessive bleed, not an acceptable paintline Example 1

A clean reactor fitted with over head condenser, mechanical stirrer, and temperature probe, was charged with 918 parts by weight of acetone, 807 parts by weight of 1-bromohexadecane (n-hexadecyl bromide, $C_{16}H_{33}Br$), 415.5 parts by weight of 2-(dimethylamino)ethyl methacrylate (DMAEMA), 2.0 parts by weight of BHT, and 2.0 parts by weight of MEHQ. The mixture was stirred at 150 rpm and 90/10 $O_2/N_2$ was purged through the solution throughout the reaction. The mixture was heated to 74° C. for 18 hours. A sample taken out for analysis by GC revealed a conversion of >98%. At this point 918 parts by weight of ethyl acetate was added to the reaction vessel slowly, while stirring at very high speed. A white solid started to precipitate from the mixture. The reaction mixture was allowed to cool to ambient temperature. The mixture was filtered to isolate the white solid precipitate and the precipitate was washed with about 200 parts by weight of cold ethyl acetate. The precipitate was transferred to a tray and dried in a vacuum oven at 40° C. for 8 hours. The dried precipitate was analyzed by NMR which revealed the presence of a compound having the following structure.

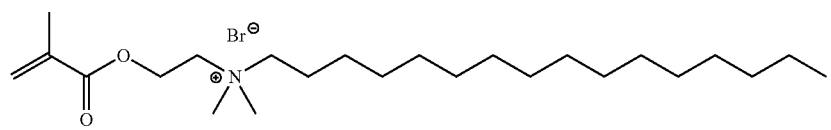 [SMILES: C=C(C)C(=O)OCC[N+](C)(C)CCCCCCCCCCCCCCCC ; [Br-]]

The structure is referred to herein as DMAEMA-$C_{16}$Br, as noted above.

Examples 2-9

Using PROCEDURE A (water) or PROCEDURE B (ethanol), polymers were synthesized from the monomers shown in Table 4. The polymers synthesized according to PROCEDURE B were coated onto a paper backing employing PROCEDURE D. The polymers synthesized according to PROCEDURE A were coated as follows.

The polymers in water were poured into clean glass molds dried at 93° C. in a forced convection oven for up to 30 minutes. The molds were allowed to cool to room temperature, and then the walls of the molds were removed to leave the dried adhesive on a flat glass plate. The paper backing described in PROCEDURE D was placed on top of the dried adhesive, and the support was rolled four times using a 4.5 lb hand roller. The supports were then peeled away, thereby removing the adhesive from the glass plate.

The tape articles were tested for paint line and adhesive transfer on glass according to PROCEDURE F. The results are shown in Table 5.

TABLE 4

Polymers synthesized according to PROCEDUREs A or B. Monomer amounts are expressed in weight ratios.

| Example No., Procedure | DMAEA-$C_1$Cl | DMAEMA-$C_{16}$Br | AA | AM-90G | NVP | IOA | IBMA | VAc |
|---|---|---|---|---|---|---|---|---|
| 2, B | 0 | 10 | 5 | 5 | 0 | 80 | 0 | 0 |
| 3, B | 10 | 0 | 5 | 5 | 0 | 80 | 0 | 0 |
| 4, B | 2 | 0 | 0 | 0 | 0 | 80 | 18 | 0 |
| 5, B | 0 | 2 | 0 | 0 | 0 | 80 | 18 | 0 |
| 6, B | 2 | 0 | 0 | 0 | 18 | 80 | 0 | 0 |
| 7, B | 0 | 2 | 0 | 0 | 18 | 80 | 0 | 0 |
| 8, A | 4 | 0 | 0 | 0 | 0 | 86 | 0 | 10 |
| 9, A | 10 | 0 | 2 | 0 | 0 | 78 | 0 | 10 |

TABLE 5

Paint line and adhesive transfer ratings for the polymers of Table 4.

| Example No. | Paint Line Score, glass | Adhesive Transfer Score, glass | Additional Observations |
|---|---|---|---|
| 2 | 0.5 | 5 | |
| 3 | 0 | 5 | |
| 4 | 0.5 | 0 | Difficult to peel - high adhesion |
| 5 | 0.5 | 5 | |
| 6 | 0.5 | 2 | |
| 7 | 0 | 3 | |
| 8 | 0.5 | 0 | Easy to peel - moderate adhesion |
| 9 | 0.5 | 2 | Easy to peel - moderate adhesion |
| C1 | 2 | 0 | |
| C2 | 0 | 0 | |

TABLE 5-continued

Paint line and adhesive transfer ratings for the polymers of Table 4.

| Example No. | Paint Line Score, glass | Adhesive Transfer Score, glass | Additional Observations |
|---|---|---|---|
| C3 | 3 | 0 | |
| C4 | 0.5 | 0 | |

Examples 10-15

Using PROCEDURE C, polymers were synthesized from the monomers shown in Table 6 targeting 39 wt %-40 wt % solids in water; or using PROCEDURE B, targeted 60 wt %-61 wt % solids in ethanol. The polymers were coated onto a paper support employing PROCEDURE D to form masking tape articles. The masking tape articles were tested for paint line and adhesive transfer on glass and painted wallboard according to PROCEDURE F. The results are shown in Table 7. The masking tapes were tested for peel adhesion to glass and stainless steel according to PROCEDURE F. The results are shown in Table 8.

TABLE 6

Polymers synthesized according to Procedures B or C. Amounts are expressed in parts by weight.

| Example No. | DMAEA-$C_1Cl$ | HPA | VAc | IOA | IBMA | MA |
|---|---|---|---|---|---|---|
| 10 | 8 | 0 | 20 | 72 | 0 | 0 |
| 11 | 8 | 0 | 10 | 77 | 5 | 0 |
| 12 | 8 | 0 | 10 | 72 | 10 | 0 |
| 13 | 8 | 0 | 10 | 62 | 20 | 0 |
| 14[1] | 8 | 10 | 10 | 72 | 0 | 0 |
| 15 | 8 | 0 | 10 | 72 | 0 | 10 |

[1]Precipitated - not coated or tested

TABLE 7

Paint line and adhesive transfer ratings for the polymers of Table 6.

| | Glass | | Painted Wallboard | |
|---|---|---|---|---|
| Example No. | Paint Line Score | Adhesive Transfer Score | Paint Line Score | Adhesive Transfer Score |
| 10 | 1 | 0 | 1 | 0 |
| 11 | 0 | 0 | 0.5 | 0 |
| 12 | 0 | 0 | 0.5 | —[1] |
| 13 | 0 | 0 | 1 | —[1] |
| 15 | 0 | 0 | 0.5 | —[1] |
| C1 | 1 | 0 | 1 | 0 |
| C2 | 0.5 | 0 | 1 | 0 |
| C3 | 3 | 0 | 3 | 0 |
| C4 | 0.5 | 0 | 1 | 0 |

[1]Peeled surface paper from wallboard.

TABLE 8

Peel adhesion of masking tape articles to glass and a painted wood substrate (paint used was Sherwin Williams Super Paint, Exterior Acrylic Latex in super white).

| Example No. | Peel Adhesion, glass, g | Peel Adhesion, painted substrate, g |
|---|---|---|
| 10 | 1362.19 | 1664.68 |
| 11 | 1376.65 | 1540.23 |
| 12 | 1341.78 | 1570.85 |
| 13 | 1426.83 | 1591.82 |
| 15 | 1204.57 | 1374.10 |
| C1 | 1028.52 | 972.67 |
| C2 | 557.35 | 536.66 |
| C3 | 408.80 | 357.20 |
| C4 | 511.42 | 515.11 |

Examples 16-30

Using PROCEDURE C, polymers were synthesized employing 8 parts by weight of DMAEA-$C_1Cl$, and varying the monomer structure and content as shown in Table 9. All syntheses targeted 39 wt %-40 wt % solids in water.

TABLE 9

Polymers synthesized according to PROCEDURE C. Amounts are expressed in parts by weight. DMAEA-$C_1Cl$ was added in each case at 8 parts by weight.

| Example No. | VAc | IOA | AA | MA | SiMac 12K | ODA | STA |
|---|---|---|---|---|---|---|---|
| 16 | 10 | 82 | | | | | |
| 17 | 20 | 72 | | | | | |
| 18 | 30 | 62 | | | | | |
| 19[1] | 10 | 80 | 2 | | | | |
| 20[1] | 10 | 80 | | 2 | | | |
| 21[1] | 0 | 90 | | 2 | | | |
| 22 | 10 | 77 | | | 5 | | |
| 23 | 5 | 87 | | | | | |
| 24[2] | 10 | 82 | | | | | |
| 25 | 10 | 72 | | | | 10 | |
| 26 | 10 | 72 | | | | | 10 |
| 27 | 10 | 80 | 2 | | | | |
| 28 | 10 | 80 | | 2 | | | |
| 29 | 0 | 88 | | 4 | | | |
| 30 | 10 | 77 | | | 5 | | |

[1]KOH added according to PROCEDURE C.

[2]Additional surfactant added for a total of 8 parts by weight of ETHOQUAD ® C25.

Before coating the emulsions, some were tested for shear instability. Using a stress-controlled rheometer (Model AR-G2 from TA Instruments of New Castle, Del.) each tested emulsion was subjected to a shear stress ramp from 0 to 500 Pa over a period of 20 min at a constant temperature of 25° C. Data collected was shear rate in reciprocal seconds ($s^{-1}$) as a function of shear stress (Pa). A change in direction of the slope of shear rate vs. shear stress indicates a change in the response of the sample to shear, or onset of shear instability. Onset of emulsion instability as a function of shear for the tested emulsions is shown in Table 10.

TABLE 10

Onset of shear instability for polymer emulsions of Table 9.

| Example No. | Onset of Instability, Pa |
|---|---|
| 16 | 133 |
| 17 | >200 |
| 18 | 150 |
| 23 | 96 |
| 24 | 110 |
| 25 | 138 |
| 26 | 109.3 |
| 27 | >200 |
| 28 | 160 |
| 29 | 142.6 |
| 30 | 137 |

The emulsions were coated onto a paper support employing PROCEDURE E to form masking tape articles. The masking tape articles were tested for peel adhesion to glass and stainless steel according to PROCEDURE F. In some cases, peel adhesion was further measured after 24 hours or 168 hours on the glass or stainless steel substrate. The results are shown in Table 11.

TABLE 11

Peel adhesion from glass and stainless steel for the masking tape articles formed from the polymers of Table 9.

| Example No. | Glass (g); residence time (hr) | | | Stainless Steel (g); residence time (hr) | | |
|---|---|---|---|---|---|---|
| | 0 | 24 | 168 | 0 | 24 | 168 |
| 16 | 1004.99 | — | — | 644.38 | — | — |
| 17 | 915.69 | — | — | 1020.87 | — | — |
| 18 | 241.54 | — | — | 201.56 | — | — |
| 23 | 822.14 | 798.61 | 760.90 | 849.63 | 845.38 | 815.90 |
| 24 | 993.37 | 782.45 | 862.96 | 1051.20 | 1016.61 | 1107.61 |
| 25 | 108.01 | — | — | 143.45 | — | — |
| 26 | 127.86 | — | — | 143.73 | — | — |
| 27 | 972.39 | 833.76 | 1059.14 | 915.12 | 995.63 | 1102.51 |
| 28 | 1093.72 | 968.14 | 1134.55 | 1135.40 | 1120.09 | 1230.37 |
| 29 | 725.75 | 721.49 | 712.42 | 1080.97 | 848.50 | 1044.96 |
| 30 | 837.16 | 771.39 | 802.57 | 812.21 | 786.70 | 854.45 |
| C1 | 1211.37 | — | — | 840.85 | — | — |
| C2 | 606.40 | — | — | 573.51 | — | — |
| C3 | 612.07 | — | — | 581.73 | — | — |
| C4 | 674.72 | — | — | 653.17 | — | — |

The masking tape articles were tested for paint line on wallboard according to PROCEDURE F. Four test paints were used to score each masking tape formed from the polymers of Table 9. The results are shown in Table 12.

TABLE 12

Paint line analysis for the masking tape articles formed from the polymers of Table 9.

| | | Paintline on Painted Wallboard | | |
|---|---|---|---|---|
| Example No. | Paint Line on Glass | Sherwin Williams Emerald | Behr Premium Plus Ultra | Valspar Signature Hi-Def |
| 16 | 2.0 | 4.0 | 3.0 | 3.5 |
| 17 | 2.0 | 4.0 | 2.5 | 3.0 |
| 18 | 1.0 | 3.7 | 2.5 | 2.0 |
| 23 | 0.5 | 2.0 | 2.0 | 1.5 |
| 24 | 1.0 | 3.5 | 2.5 | 2.0 |
| 25 | 4.0 | 4.0 | 3.0 | 4.0 |
| 26 | 4.0 | 4.0 | 3.0 | 4.0 |
| 27 | 1.0 | 2.2 | 2.5 | 2.5 |
| 28 | 0.5 | 1.5 | 2.5 | 2.0 |
| 29 | 1.0 | 2.0 | 2.5 | 2.0 |
| 30 | 3.0 | 3.2 | 3.0 | 3.5 |

Example 31

A polymer was formed using PROCEDURE C and having monomer content as follows (in parts by weight): 8 DMAEA-$C_1$Cl; 10 VAc; 80 IOA; 2 MA. Total solids of the emulsion was 43.2 wt %. After completion of polymerization, the emulsion was divided into five portions; four of the portions were neutralized with different neutralizing agents to reach a pH of about 6, and the fifth portion was not neutralized. Neutralizing agents used were KOH, NaOH, LiOH, and triethanolamine (TEA). The five portions were coated onto a paper support employing PROCEDURE E to form masking tape articles. The masking tape articles were scored for paint line on glass and wallboard, and tested for peel adhesion on glass and stainless steel according to PROCEDURE F. The results are shown in Table 13.

TABLE 13

Paint line scores and peel adhesion for the masking tape articles formed from the polymer of Example 31.

| Neut. Agent | Paint line, glass | Paint line, wallboard SW Emerald | Peel adhesion (g), glass | Peel adhesion (g), stainless steel |
|---|---|---|---|---|
| none | 0 | 2.5 | 1404.43 | 1323.35 |
| KOH | 0 | 2.5 | 1533.14 | 1154.68 |
| NaOH | 0.5 | 2.5 | 1359.64 | 1331.01 |
| LiOH | 0.5 | 2 | 989.40 | 1257.87 |
| TEA | 0 | 2 | 1284.80 | 1255.03 |

Examples 32 and 33

A polymer was formed using PROCEDURE C and having monomer content as follows (in parts by weight): 8 DMAEA-$C_1$Cl; 5 VAc; 85 IOA; 2 MA. Total solids of the emulsion was 48 wt %. After completion of polymerization, the emulsion was divided into two portions. One portion, labeled Example 32, was not neutralized and had a pH of about 2.5. The second portion, labeled Example 33, was neutralized with NaOH to a pH of about 6. Each of the two emulsions was coated onto a standard crepe paper support and a "smooth structured" crepe paper support ("SS crepe") employing PROCEDURE E to form masking tape articles. The masking tape articles were scored for paint line on glass and wallboard, using three different test paints according to PROCEDURE F for wallboard. The paint used for testing on glass was PPG. The results are shown in Table 14.

TABLE 14

Paint line scores on glass and wallboard for the masking tapes made from the polymer emulsions of Examples 32 and 33.

| | | Paint Line | Paint Line Score, Wallboard | | |
|---|---|---|---|---|---|
| Backing | Example No. | Score, Glass | SW Emerald | Behr PPU | Valspar S HD |
| Crepe | 32 | 1 | 2 | 2 | 3 |
| | 33 | 1 | 2 | 2.5 | 3 |
| SS Crepe | 32 | 0.5 | 2 | 2 | 2.5 |
| | 33 | 0.5 | 2 | 2 | 2.5 |
| As Supplied | C2 | 0.5 | 4 | 3 | 3 |
| | C4 | 0.5 | 3 | 2.5 | 3 |
| | C3 | 3 | 3 | 3 | 3 |
| | C1 | 1 | 2.5 | 2.5 | 3 |

The polymer emulsions of Examples 32 and 33, coated on both standard and smooth structured crepe paper, were subjected to further paint line analysis using PROCEDURE F but on varnished oak and varnished pine boards. The results are shown in Table 15.

TABLE 15

Paint line scores on varnished pine and oak boards for the masking tapes made from the polymer emulsions of Examples 32 and 33.

| | Paint Line Score | |
|---|---|---|
| Example No. (paper) | Varnished Pine | Varnished Oak |
| 32 (crepe) | 0.5 | 0.5 |
| 33 (crepe) | 0.5 | 0 |
| 32 (SS crepe) | 0 | 0 |

TABLE 15-continued

Paint line scores on varnished pine and oak boards
for the masking tapes made from the polymer emulsions
of Examples 32 and 33.

| | Paint Line Score | |
|---|---|---|
| Example No. (paper) | Varnished Pine | Varnished Oak |
| 33 (SS crepe) | 0.5 | 0.5 |
| C2 | 0 | 1 |
| C4 | 0 | 1 |
| C3 | 0.5 | 2 |
| C1 | 0.5 | 2 |

Examples 34-39

A polymer was formed using PROCEDURE C and having monomer content as follows (in parts by weight): 8 DMAEA-C$_1$Cl; 5 VAc; 85 IOA; 2 MA. Total solids of the emulsion was 50 wt %. After completion of polymerization, the emulsion was divided into six portions. One portion, labeled Example 34, was not neutralized and had a pH of about 2.5. The second through sixth portions, labeled Examples 35 through 39, were each neutralized with NaOH to a pH of 4, 5, 5.5, 6 and 7 respectively. Each of the six emulsions were coated onto a "smooth structured" crepe paper support ("SS crepe") employing PROCEDURE E to form masking tape articles. The masking tape articles were scored for paint line on glass and wallboard, using three different test paints according to PROCEDURE F for wallboard. The paint used for testing on glass was PPG. The results are shown in Table 16.

TABLE 16

Paint line scores on glass and wallboard for the
masking tapes made from the polymer emulsions of
Examples 34 through 39.

| | | Paint Line | Paint Line Score, Wallboard | | |
|---|---|---|---|---|---|
| Backing | Example No. | Score, Glass | SW Emerald | Behr PPU | Valspar S HD |
| SS Crepe | 34 | 0 | 2 | 1.5 | 2 |
| | 35 | 0 | 2 | 1.5 | 1 |
| | 36 | 0 | 2 | 1 | 2 |
| | 37 | 0 | 2 | 1.5 | 1 |
| | 38 | 0 | 2 | 1 | 1.5 |
| | 39 | 0.5 | 2 | 1.5 | 2 |
| As supplied | C1 | 1 | 1 | 1.5 | 2 |
| | C2 | 0 | 4 | 4 | 4 |
| | C3 | 2 | 2.5 | 3 | 3 |
| | C4 | 0 | 2.5 | 1.5 | 2.5 |
| | C5 | 0.5 | 0 | 0.5 | 0.5 |

The polymer emulsions of Examples 34 through 39, coated on smooth structured crepe paper, were further tested for peel adhesion on glass and stainless steel according to PROCEDURE F under two different environmental conditions: (1) 21° C./20% RH and (2) 21° C./50% RH. The results are shown in Table 17.

TABLE 17

Peel adhesion from glass and stainless steel at 21° C./20%
RH and 21° C./50% RH for the masking tape articles
formed from the polymers 34 through 39.

| Example No. | Peel adhesion (g), glass | | Peel adhesion (g), stainless steel | |
|---|---|---|---|---|
| | 20% RH | 50% RH | 20% RH | 50% RH |
| 34 | 1113.57 | 1399.05 | 1426.55 | 1358.79 |
| 35 | 1309.75 | 1384.59 | 1377.50 | 1358.22 |
| 36 | 1295.86 | 1437.60 | 1262.40 | 1327.61 |
| 37 | 1232.64 | 1337.53 | 1317.68 | 1300.96 |
| 38 | 1283.95 | 1381.47 | 1341.78 | 1281.96 |
| 39 | 1142.48 | 1298.12 | 953.96 | 1259.28 |

The present invention may suitably comprise, consist of, or consist essentially of, any of the disclosed or recited elements. As used herein, the term "consisting essentially of" does not exclude the presence of additional materials which do not significantly affect the desired characteristics of a given composition or product.

The invention illustratively disclosed herein can be suitably practiced in the absence of any element which is not specifically disclosed herein. The various embodiments described above are provided by way of illustration only and should not be construed to limit the claims attached hereto. It will be recognized that various modifications and changes may be made without following the example embodiments and applications illustrated and described herein, and without departing from the true spirit and scope of the following claims.

We claim:

1. An adhesive composition, the composition comprising one or more surfactants at least one of which has quaternary ammonium functionality and an emulsified, zwitterionic polymer, the polymer consisting essentially of the polymerized product of
    a. 0.2 wt % to 5 wt % based on the total weight of the polymer of an anionic monomer, the anionic monomer is an acrylic acid, methacrylic acid, a carboxylate salt thereof, or a mixture of two or more thereof, wherein the amount of carboxylate salt is determined based on the weight of the corresponding free acid;
    b. 50 wt % to 88 wt % based on the total weight of the polymer of an acrylate or methacrylate ester of an alcohol having between 8 and 12 carbon atoms, or a mixture of two or more thereof;
    c. 2 wt % to 45 wt % based on the total weight of the polymer of a cationic monomer, wherein the cationic monomer is an acrylate or methacrylate ester having an alkylammonium functionality;
    d. 10 wt % to 30 wt % based on the total weight of the polymer of vinyl acetate and optionally one of isobutyl acrylate and N-vinyl pyrrolidone; and
    e. 0 wt % to 2 wt % based on the total weight of the polymer of a crosslinker, wherein the onset of shear instability occurs between about 90 Pa and 300 Pa.

2. The adhesive composition of claim 1 wherein the polymer and the one or more surfactants together comprise 15 wt % to 60 wt % of the composition and the composition further comprises water.

3. The adhesive composition of claim 1, wherein the acrylate or methacrylate ester having an alkylammonium functionality is present in the polymer at 2 wt % to 12 wt % based on the total weight of the polymer.

4. The adhesive composition of claim 3, wherein the acrylate or methacrylate ester having an alkylammonium functionality is present in the polymer at 2 wt % to 4 wt % based on the total weight of the polymer.

5. The adhesive composition of claim 1 wherein the carboxylate salt of acrylic acid or methacrylic acid is a sodium salt.

6. The adhesive composition of claim 1 wherein the acrylate or methacrylate ester of an alcohol having between 8 and 12 carbon atoms is isooctyl acrylate.

7. The adhesive composition of claim 1 wherein the acrylate or methacrylate ester including an alkylammonium functionality is the reaction product of 2-(dimethylamino) ethyl acrylate or 2-(dimethylamino)ethyl methacrylate with an alkyl bromide or an alkyl chloride having between 1 and 24 carbon atoms.

8. The adhesive composition of claim 1 wherein the acrylate or methacrylate ester including an alkylammonium functionality is 2-(trimethylammonium)ethyl methacrylate chloride.

9. The adhesive composition of claim 1 wherein the polymer consists essentially of the polymerized product of sodium methacrylate, isooctyl acrylate, 2-(trimethylammonium)ethyl methacrylate chloride, and vinyl acetate.

10. The adhesive composition of claim 1, wherein the vinyl acetate, and optionally one or more of isobutyl acrylate, and N-vinyl pyrrolidone, is present in the polymer at 12 wt % to 30 wt % based on the total weight of the polymer, and wherein the acrylate or methacrylate ester of an alcohol having between 8 and 12 carbon atoms is present in the polymer at 50 wt % to 86 wt % based on the total weight of the polymer.

11. The adhesive composition of claim 1, wherein the vinyl acetate and optionally one or more of isobutyl acrylate, and N-vinyl pyrrolidone, is a mixture of vinyl acetate and isobutyl acrylate.

12. An adhesive article comprising a support having first and second opposed major surfaces, and an adhesive composition according to claim 1 disposed on at least a portion of at least one of the first and second opposed major surfaces.

13. The adhesive article of claim 12, and further comprising a paint formulation applied to at least a portion of the support; wherein the adhesive composition inhibits the migration of the paint beyond an edge of an interface at least partially defined by the adhesive composition.

* * * * *

UNITED STATES PATENT AND TRADEMARK OFFICE
CERTIFICATE OF CORRECTION

PATENT NO. : 10,883,021 B2  
APPLICATION NO. : 15/803168  
DATED : January 5, 2021  
INVENTOR(S) : Mahfuza Ali et al.

Page 1 of 1

It is certified that error appears in the above-identified patent and that said Letters Patent is hereby corrected as shown below:

In the Specification

Column 5, Line 2, delete "a, (3-unsaturated" and insert -- α, β-unsaturated --

Column 5, Lines 3-4, delete ""a, 13-unsaturated" and insert -- α, β-unsaturated --

Column 7, Lines 11-12, delete "(meth)acrylate)," and insert -- (meth)acrylate, --

Column 9, Line 20, delete "$O_{03}SC_4F_9$." and insert -- $O_3SC_4F_9$. --

Column 11, Line 41, delete "azobisbutyrylnitrile" and insert -- azobisisobutyronitrile --

Column 13, Line 29, delete "lauroamphacetate)." and insert -- lauroamphoacetate). --

Column 25-26 (Table 1), Line 3, delete "Marrietta," and insert -- Marietta, --

Column 25-26 (Table 1), Line 16, delete "Cyro" and insert -- Cryo --

Column 27, Line 3, delete "modeloven" and insert -- model oven --

Column 28, Line 33, delete "Colo.)" and insert -- Co.), --

Signed and Sealed this  
Thirteenth Day of July, 2021

Drew Hirshfeld  
*Performing the Functions and Duties of the*  
*Under Secretary of Commerce for Intellectual Property and*  
*Director of the United States Patent and Trademark Office*